United States Patent
Feldman et al.

(10) Patent No.: US 9,324,232 B2
(45) Date of Patent: Apr. 26, 2016

(54) METHOD AND SYSTEM FOR MODELING AND PROCESSING VEHICULAR TRAFFIC DATA AND INFORMATION AND APPLYING THEREOF

(75) Inventors: Israel Feldman, Herzliya (IL); Arie Trinker, Haifa (IL); Yochai Meltzer, Givatayim (IL); Allon Eshpar, Kefar Saba (IL); Amnon Lotem, Hod-Hasharon (IL)

(73) Assignee: INRX Gloabal Services Limited (GB)

( * ) Notice: Subject to any disclaimer, the term of this patent is extended or adjusted under 35 U.S.C. 154(b) by 0 days.

(21) Appl. No.: 11/280,833

(22) Filed: Nov. 15, 2005

(65) Prior Publication Data

US 2006/0069496 A1 Mar. 30, 2006

Related U.S. Application Data

(60) Continuation of application No. 10/999,994, filed on Dec. 1, 2004, which is a division of application No.

(Continued)

(51) Int. Cl.
*G06F 19/00* (2011.01)
*G06G 7/70* (2006.01)
(Continued)

(52) U.S. Cl.
CPC .................................... *G08G 1/0104* (2013.01)

(58) Field of Classification Search
USPC ......... 701/117, 201, 209, 210, 400, 408–412, 701/414, 420, 422, 423, 430, 431, 460, 467, 701/485, 522, 526, 446, 119, 540, 536; 705/417, 1, 13; 342/465
See application file for complete search history.

(56) References Cited

U.S. PATENT DOCUMENTS

| | | | |
|---|---|---|---|
| 4,361,202 A | 11/1982 | Minovitch | |
| 4,985,705 A | 1/1991 | Stammler | |

(Continued)

FOREIGN PATENT DOCUMENTS

| | | |
|---|---|---|
| CA | 2 434 707 A1 | 3/2004 |
| DE | 33 46 548 A1 | 7/1985 |

(Continued)

OTHER PUBLICATIONS

Wang, et al., "An Unified Vehicle Supervising and Traffic Information System", National Chiao Tung University, Taiwan, 1996 IEEE, pp. 968-972.

(Continued)

*Primary Examiner* — Ronnie Mancho
(74) *Attorney, Agent, or Firm* — Burns & Levinson LLP; Joseph M. Maraia

(57) ABSTRACT

A method and system for modeling and processing vehicular traffic data and information, comprising: (a) transforming a spatial representation of a road network into a network of spatially interdependent and interrelated oriented road sections, for forming an oriented road section network; (b) acquiring a variety of the vehicular traffic data and information associated with the oriented road section network, from a variety of sources; (c) prioritizing, filtering, and controlling, the vehicular traffic data and information acquired from each of the variety of sources; (d) calculating a mean normalized travel time (NTT) value for each oriented road section of said oriented road section network using the prioritized, filtered, and controlled, vehicular traffic data and information associated with each source, for forming a partial current vehicular traffic situation picture associated with each source; (e) fusing the partial current traffic situation picture associated with each source, for generating a single complete current vehicular traffic' situation picture associated with entire oriented road section network; (f) predicting a future complete vehicular traffic situation picture associated with the entire oriented road section network; and (g) using the current vehicular traffic situation picture and the future vehicular traffic situation picture for providing a variety of vehicular traffic related service applications to end users.

25 Claims, 8 Drawing Sheets

Block diagram of the traffic prediction process

Related U.S. Application Data

10/461,478, filed on Jun. 16, 2003, now Pat. No. 6,879,907, which is a continuation of application No. 09/939,620, filed on Aug. 28, 2001, now Pat. No. 6,587,781.

(60) Provisional application No. 60/227,905, filed on Aug. 28, 2000.

(51) Int. Cl.
    *G06G 7/76*      (2006.01)
    *G08G 1/00*      (2006.01)
    *G08G 1/01*      (2006.01)

(56) References Cited

U.S. PATENT DOCUMENTS

| | | |
|---|---|---|
| 5,122,959 A | 6/1992 | Nathanson et al. |
| 5,131,020 A | 7/1992 | Liebesny et al. |
| 5,182,555 A | 1/1993 | Sumner |
| 5,187,810 A | 2/1993 | Yoneyama et al. |
| 5,272,638 A | 12/1993 | Martin et al. |
| 5,327,144 A | 7/1994 | Stilp et al. |
| 5,343,906 A | 9/1994 | Tibbals, III |
| 5,428,545 A | 6/1995 | Maegawa et al. |
| 5,432,842 A | 7/1995 | Kinoshita et al. |
| 5,438,517 A | 8/1995 | Sennott |
| 5,465,088 A | 11/1995 | Braegas |
| 5,465,289 A | 11/1995 | Kennedy, Jr. |
| 5,523,950 A | 6/1996 | Peterson |
| 5,539,645 A | 7/1996 | Mandhyan et al. |
| 5,543,789 A | 8/1996 | Behr et al. |
| 5,543,802 A | 8/1996 | Villevieille et al. |
| 5,559,864 A | 9/1996 | Kennedy, Jr. |
| 5,613,205 A | 3/1997 | Dufour |
| 5,689,252 A | 11/1997 | Ayanoglu et al. |
| 5,724,243 A | 3/1998 | Westerlage |
| 5,732,383 A | 3/1998 | Foladare et al. |
| 5,740,166 A | 4/1998 | Ekemark et al. |
| 5,745,865 A | 4/1998 | Rostoker et al. |
| 5,751,245 A | 5/1998 | Janky et al. |
| 5,774,827 A | 6/1998 | Smith et al. |
| 5,801,943 A | 9/1998 | Nasburg |
| 5,839,086 A | 11/1998 | Hirano |
| 5,845,227 A | 12/1998 | Peterson |
| 5,880,958 A | 3/1999 | Helms et al. |
| 5,933,100 A | 8/1999 | Golding |
| 5,948,042 A | 9/1999 | Heimann et al. |
| 5,959,568 A | 9/1999 | Woolley |
| 6,012,012 A | 1/2000 | Fleck et al. |
| 6,038,444 A | 3/2000 | Schipper et al. |
| 6,061,625 A | 5/2000 | Fastenrath |
| 6,091,362 A * | 7/2000 | Stilp et al. ............ 342/465 |
| 6,092,020 A | 7/2000 | Fastenrath et al. |
| 6,098,016 A | 8/2000 | Ishihara |
| 6,128,571 A | 10/2000 | Ito et al. |
| 6,161,071 A | 12/2000 | Shuman et al. |
| 6,178,374 B1 | 1/2001 | Mohlenkamp et al. |
| 6,219,793 B1 | 4/2001 | Li et al. |
| 6,230,011 B1 | 5/2001 | Guenther et al. |
| 6,236,932 B1 | 5/2001 | Fastenrath |
| 6,236,933 B1 | 5/2001 | Lang |
| 6,240,364 B1 | 5/2001 | Kerner et al. |
| 6,256,577 B1 | 7/2001 | Graunke |
| 6,263,205 B1 | 7/2001 | Yamaura et al. |
| 6,288,676 B1 | 9/2001 | Maloney |
| 6,314,360 B1 | 11/2001 | Becker |
| 6,317,686 B1 | 11/2001 | Ran |
| 6,341,255 B1 * | 1/2002 | Lapidot .................. 701/209 |
| 6,401,027 B1 | 6/2002 | Xu et al. |
| 6,401,037 B1 | 6/2002 | Muller et al. |
| 6,411,897 B1 | 6/2002 | Gaspard, II |
| 6,424,838 B1 | 7/2002 | Stobbe et al. |
| 6,430,496 B1 * | 8/2002 | Smith et al. .............. 701/117 |
| 6,438,561 B1 | 8/2002 | Israni et al. |
| 6,466,862 B1 | 10/2002 | Dekock et al. |
| 6,480,783 B1 | 11/2002 | Myr |
| 6,490,519 B1 | 12/2002 | Lapidot et al. |
| 6,532,414 B2 | 3/2003 | Mintz |
| 6,545,637 B1 | 4/2003 | Krull |
| 6,587,781 B2 | 7/2003 | Feldman et al. |
| 6,594,577 B2 | 7/2003 | Nakajima et al. |
| 6,606,494 B1 | 8/2003 | Arpee et al. |
| 6,618,650 B1 * | 9/2003 | Nakai et al. .................. 701/1 |
| 6,708,036 B2 | 3/2004 | Proctor et al. |
| 6,711,404 B1 | 3/2004 | Arpee et al. |
| 6,718,425 B1 * | 4/2004 | Pajakowski et al. .......... 710/315 |
| 6,792,263 B1 | 9/2004 | Kite |
| 6,799,046 B1 | 9/2004 | Tang |
| 6,842,620 B2 | 1/2005 | Smith et al. |
| 6,882,930 B2 | 4/2005 | Trayford et al. |
| 6,911,918 B2 | 6/2005 | Chen |
| 6,922,629 B2 | 7/2005 | Yoshikawa et al. |
| 6,931,309 B2 | 8/2005 | Phelan et al. |
| 6,947,833 B2 | 9/2005 | Kita et al. |
| 6,952,643 B2 | 10/2005 | Matsuoka et al. |
| 6,989,765 B2 | 1/2006 | Gueziec |
| 7,031,983 B2 | 4/2006 | Israni et al. |
| 7,062,379 B2 | 6/2006 | Videtich |
| 7,107,038 B2 | 9/2006 | Fitch et al. |
| 7,155,376 B2 | 12/2006 | Yang et al. |
| 7,269,507 B2 * | 9/2007 | Cayford ...................... 701/446 |
| 7,620,402 B2 | 11/2009 | Feldman et al. |
| 7,986,954 B1 | 7/2011 | Steer |
| 2001/0018628 A1 | 8/2001 | Jenkins et al. |
| 2001/0029425 A1 | 10/2001 | Myr |
| 2001/0034577 A1 | 10/2001 | Grounds et al. |
| 2001/0037174 A1 | 11/2001 | Dickerson |
| 2002/0009184 A1 | 1/2002 | Shnier |
| 2002/0026278 A1 | 2/2002 | Feldman et al. |
| 2002/0030698 A1 | 3/2002 | Baur et al. |
| 2002/0049630 A1 * | 4/2002 | Furuta et al. .................. 705/13 |
| 2002/0055818 A1 | 5/2002 | Gaspard |
| 2002/0120390 A1 | 8/2002 | Bullock |
| 2002/0198694 A1 | 12/2002 | Yang et al. |
| 2003/0003918 A1 | 1/2003 | Proctor et al. |
| 2003/0040944 A1 | 2/2003 | Hileman |
| 2003/0069683 A1 | 4/2003 | Lapidot et al. |
| 2003/0096620 A1 | 5/2003 | Ozturk et al. |
| 2003/0135304 A1 | 7/2003 | Sroub et al. |
| 2003/0219024 A1 | 11/2003 | Purnadi et al. |
| 2003/0236818 A1 | 12/2003 | Bruner et al. |
| 2004/0034464 A1 | 2/2004 | Yoshikawa et al. |
| 2004/0076279 A1 | 4/2004 | Taschereau |
| 2004/0082312 A1 | 4/2004 | O'Neill et al. |
| 2004/0111214 A1 | 6/2004 | Buecher et al. |
| 2004/0243285 A1 | 12/2004 | Grounder |
| 2005/0026619 A1 | 2/2005 | Jha |
| 2005/0065682 A1 | 3/2005 | Kapadia et al. |
| 2005/0131641 A1 | 6/2005 | Beesley et al. |
| 2005/0192031 A1 | 9/2005 | Vare |
| 2006/0009885 A1 | 1/2006 | Raines et al. |
| 2006/0025158 A1 | 2/2006 | Leblanc et al. |
| 2007/0060108 A1 | 3/2007 | East et al. |
| 2007/0106465 A1 | 5/2007 | Adam et al. |
| 2008/0214192 A1 | 9/2008 | Soliman |
| 2009/0036148 A1 | 2/2009 | Yach |
| 2010/0010739 A1 | 1/2010 | Tsushima |

FOREIGN PATENT DOCUMENTS

| | | |
|---|---|---|
| DE | 40 05 803 A1 | 8/1990 |
| DE | 42 41 408 A1 | 6/1994 |
| DE | 196 38 798 | 9/1996 |
| DE | 195 25 291 C1 | 12/1996 |
| DE | 196 51 146 A1 | 6/1998 |
| DE | 197 55 875 A1 | 6/1998 |
| DE | 199 17 154 A1 | 10/2000 |
| DE | 199 33 639 A1 | 1/2001 |
| DE | 199 48 416 A1 | 4/2001 |
| DE | 100 63 588 A1 | 7/2001 |
| DE | 100 37 827 A1 | 2/2002 |
| EP | 0 365 097 A1 | 4/1990 |
| EP | 0 372 840 A2 | 6/1990 |

(56) References Cited

FOREIGN PATENT DOCUMENTS

| | | |
|---|---|---|
| EP | 0 715 285 A1 | 6/1996 |
| EP | 0 715 286 A1 | 6/1996 |
| EP | 0 715 288 A1 | 6/1996 |
| EP | 0 715 291 A1 | 6/1996 |
| EP | 0 763 807 A1 | 3/1997 |
| EP | 0 838 663 A2 | 4/1998 |
| EP | 0 838 797 A1 | 4/1998 |
| EP | 0951187 B1 | 4/1998 |
| EP | 0 936 590 A2 | 8/1999 |
| EP | 1 162 560 A2 | 12/2001 |
| EP | 0 834 840 B1 | 6/2002 |
| EP | 1 320 075 A2 | 6/2003 |
| EP | 1 387 333 A1 | 2/2004 |
| EP | 0 921 509 B1 | 4/2004 |
| EP | 1591980 A1 | 2/2005 |
| EP | 1 515 122 A1 | 3/2005 |
| EP | 1600910 A2 | 11/2005 |
| EP | 0 763 807 B2 | 8/2006 |
| EP | 1550842 A1 | 7/2007 |
| JP | 1-137778 | 5/1989 |
| JP | 4-290098 | 10/1992 |
| JP | 5-46086 | 2/1993 |
| JP | 0546086 A | 2/1993 |
| JP | 5233996 A | 7/1993 |
| JP | 5-233996 | 9/1993 |
| JP | 6-12593 | 1/1994 |
| JP | 7-83685 | 3/1995 |
| JP | 8-129697 | 5/1996 |
| JP | 9-14986 | 1/1997 |
| JP | 914986 A | 1/1997 |
| JP | 9113290 A | 5/1997 |
| JP | 10300495 A | 11/1998 |
| JP | 11-25389 | 1/1999 |
| JP | 2927277 B2 | 7/1999 |
| JP | 11328571 A | 11/1999 |
| JP | 3052405 B2 | 6/2000 |
| JP | 2001-124569 | 5/2001 |
| JP | 3171031 B2 | 5/2001 |
| JP | 2002122437 A | 4/2002 |
| JP | 2002-206395 | 7/2002 |
| JP | 3353656 B2 | 12/2002 |
| JP | 3367514 B2 | 1/2003 |
| JP | 3566503 B2 | 9/2004 |
| WO | WO 94/11839 | 5/1994 |
| WO | 9502307 A1 | 1/1995 |
| WO | 9514292 A1 | 5/1995 |
| WO | WO 95/14292 | 5/1995 |
| WO | WO 96/10807 | 4/1996 |
| WO | WO 96/25830 | 8/1996 |
| WO | WO 96/29688 | 9/1996 |
| WO | WO 96/42179 | 12/1996 |
| WO | 9729471 A1 | 8/1997 |
| WO | WO 97/29470 | 8/1997 |
| WO | WO 97/29471 | 8/1997 |
| WO | WO 97/31241 | 8/1997 |
| WO | 9737318 A1 | 10/1997 |
| WO | WO 97/36148 | 10/1997 |
| WO | WO 97/40606 | 10/1997 |
| WO | WO 98/15149 | 4/1998 |
| WO | WO 98/15935 | 4/1998 |
| WO | WO 98/23115 | 5/1998 |
| WO | WO 98/26395 | 6/1998 |
| WO | WO 98/29758 | 7/1998 |
| WO | WO98/29758 | 7/1998 |
| WO | WO 98/36397 | 8/1998 |
| WO | 9842179 A1 | 10/1998 |
| WO | WO 98/54682 | 12/1998 |
| WO | WO98/54682 | 12/1998 |
| WO | WO 99/63499 | 12/1999 |
| WO | WO 01/01367 A1 | 1/2001 |
| WO | 0123835 A2 | 4/2001 |
| WO | WO01/23835 A2 | 4/2001 |
| WO | WO 01/35370 A1 | 5/2001 |
| WO | WO 01/48725 A1 | 7/2001 |
| WO | WO 02/01158 A1 | 1/2002 |
| WO | WO 02/01532 A1 | 1/2002 |
| WO | WO 02/03350 A1 | 1/2002 |
| WO | WO 02/43026 A1 | 5/2002 |
| WO | WO 03/041030 A2 | 5/2003 |
| WO | WO 03/073048 A2 | 9/2003 |
| WO | 2004021305 A3 | 3/2004 |
| WO | WO 2004/086799 A1 | 10/2004 |
| WO | 2005098780 A1 | 10/2005 |
| WO | WO 2008/114369 A1 | 9/2008 |

OTHER PUBLICATIONS

Wang, et al., *An Unified Vehicle Supervising and Traffic Information System*, Personal, Indoor and Mobile Radio Communications, 1996, PIMRC'96, Seventh IEEE International Symposium on, publication date Oct. 15-18, 1996, vol. 3, pp. 968-972, IEEE, Taipei, Taiwan.
United States Office Action issued in U.S. Appl. No. 10/999,994, mailed Sep. 9, 2010.
US Office Action issued in U.S. Appl. No. 11/269,908, dated Jun. 9, 2011.
United State Office Action issued in U.S. Appl. No. 10/999,994 dated Mar. 21, 2011.
United States Office Action issued in U.S. Appl. No. 11/269,908, mailed Jul. 12, 2010.
United States Office Action issued in U.S. Appl. No. 11/269,908 dated Dec. 27, 2010.
United States Office Action, issued in U.S. Appl. No. 10/999,994, dated Dec. 7, 2011.
R. Sankar et al., "Intelligent Traffic Monitoring System Using Wireless Cellular Communications," © 1997 IEEE.
K. Abe et al., "A Planning Method Combining Rule-Bases and Optimization Algorithms for Transportation Network," © 1992 IEEE.
"Data Fusion for Dynamic Route Guidance Systems," International Federation of Automatic Control (IFAC), 2361 Laxenburg, Schlossplatz 12, 1997.
N. Shamanesh, "Getting Drivers Out of a Jam," Automotive Engineer, Oct. 1999.
Fastenrath, Floating Car Data on a Larger Scale, Oct. 24, 1997.
J.J. Caffery et al., "Overview of Radiolocation in CDMA Cellular Systems," published 1998; See Chapter "Accuracy Requirement" pp. 7-8; <http://sss-mag.com/pdf/radioloc.pdf>.
International Search Report issued in International Patent Application No. PCT/GB2005/002637 dated Sep. 21, 2005.
Written Opinion of the International Searching Authority issued in International Patent Application No. PCT/GB2005/002637 dated Sep. 21, 2005.
M. Westerman et al., "Integration of Probe Vehicle and Induction Loop Data—Estimation of Travel Times and Automatic Incident Detection," California PATH Research Report, Institute of Transportation Studies, Jan. 1, 1996.
"Grubbs Test for Outliers," Engineering Statistics Handbook, 2000.
United States Office Action issued in U.S. Appl. No. 11/269,908 dated Jan. 4, 2013.
Kerner, et al., "Traffic State Detection with Floating Car Data in Road Networks", Proceedings of the 8th International IEEE Conference on Intelligent Transportation Systems Vienna, Austria, Sep. 13-16, 2005.
United States Office Action issued in U.S. Appl. No. 11/269,908 dated Jun. 21, 2013.
United States Office Action issued in U.S. Appl. No. 11/269,908 dated Jun. 22, 2012.

* cited by examiner

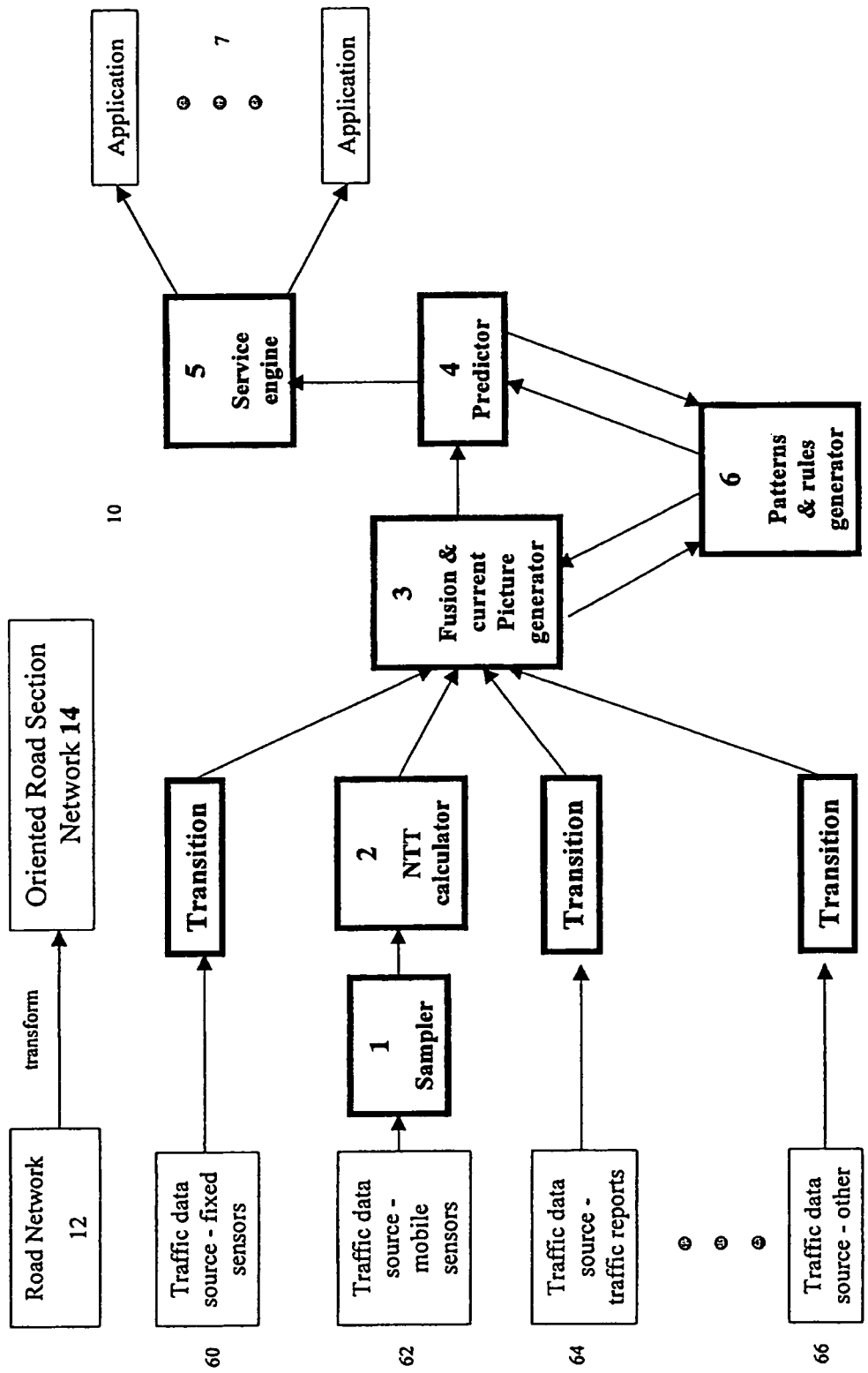
FIG 1 - Block diagram of the traffic prediction process

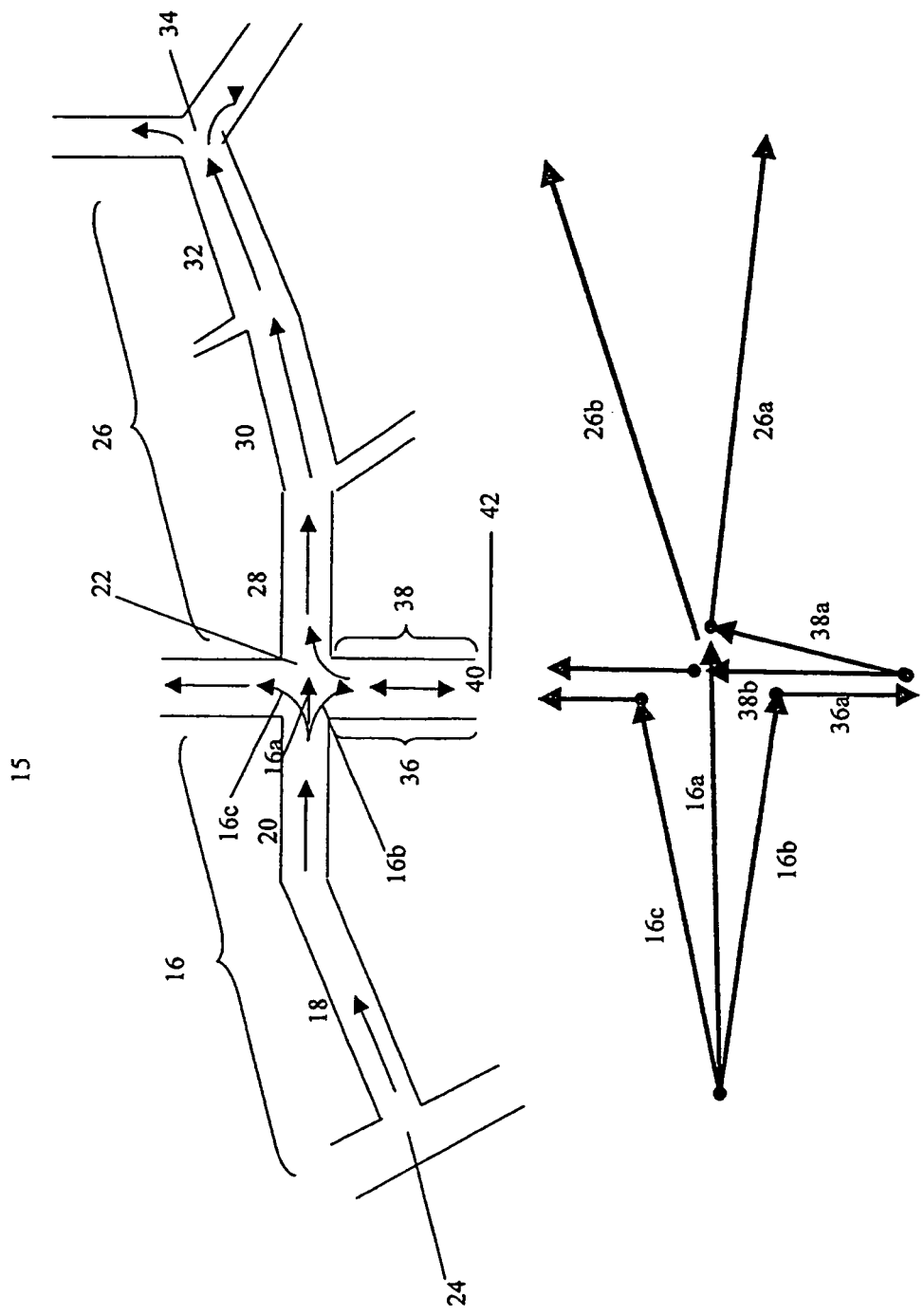
FIG 2 - The concept of oriented section

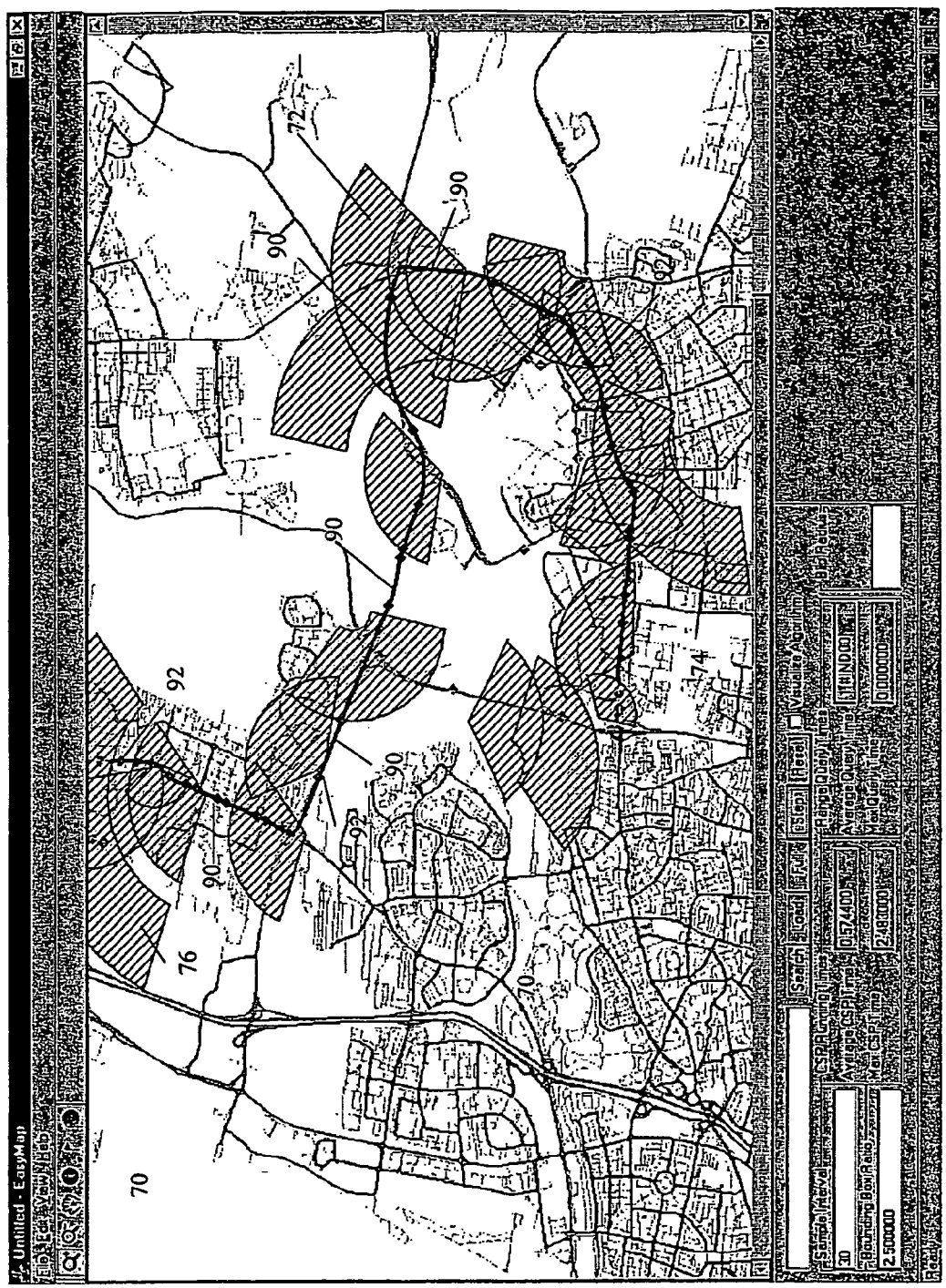
FIG 3 - Path identification of a cellular phone sensor

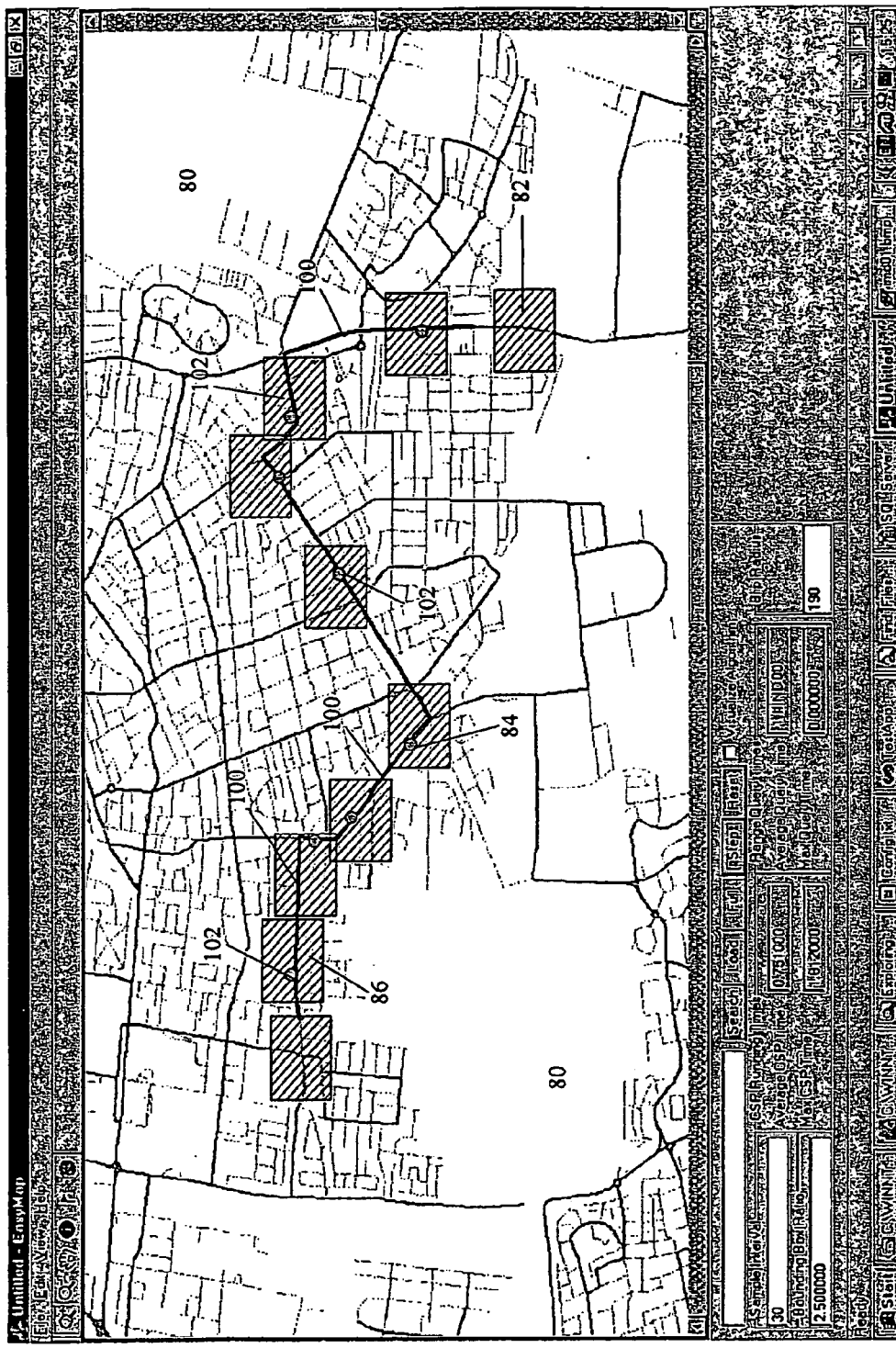
FIG 4 - Path identification of an anti-theft sensor

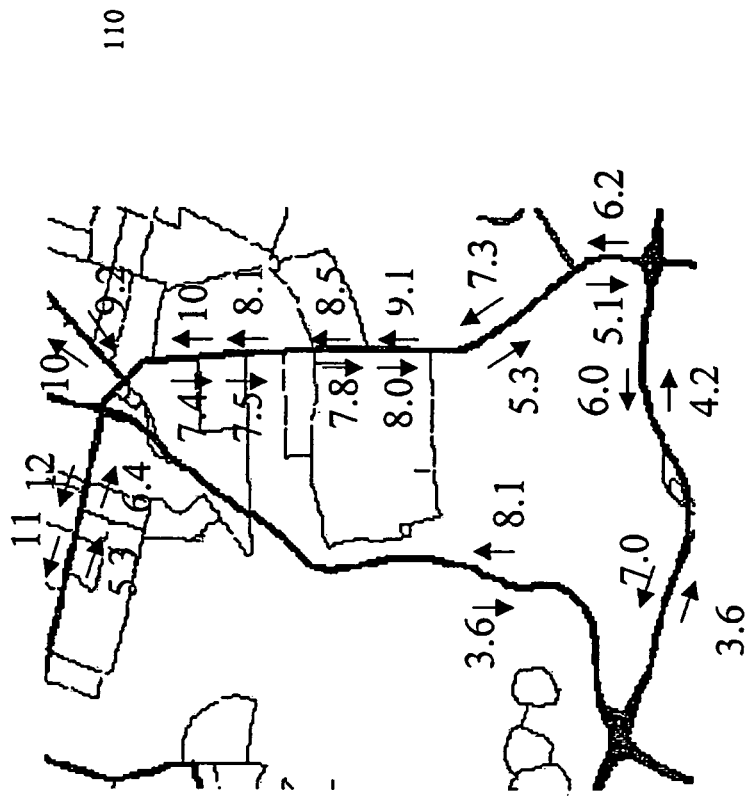
FIG 5 - A portion of traffic current situation picture with NTTs

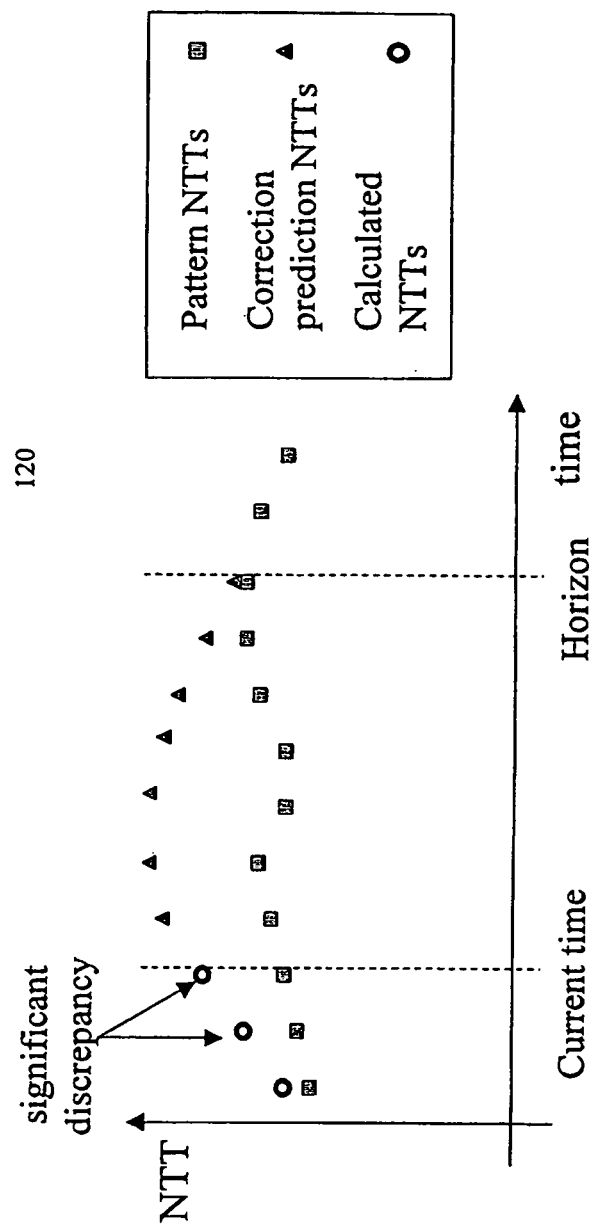
FIG 6 - A traffic behavior pattern with a demonstartion of the analysis of current input

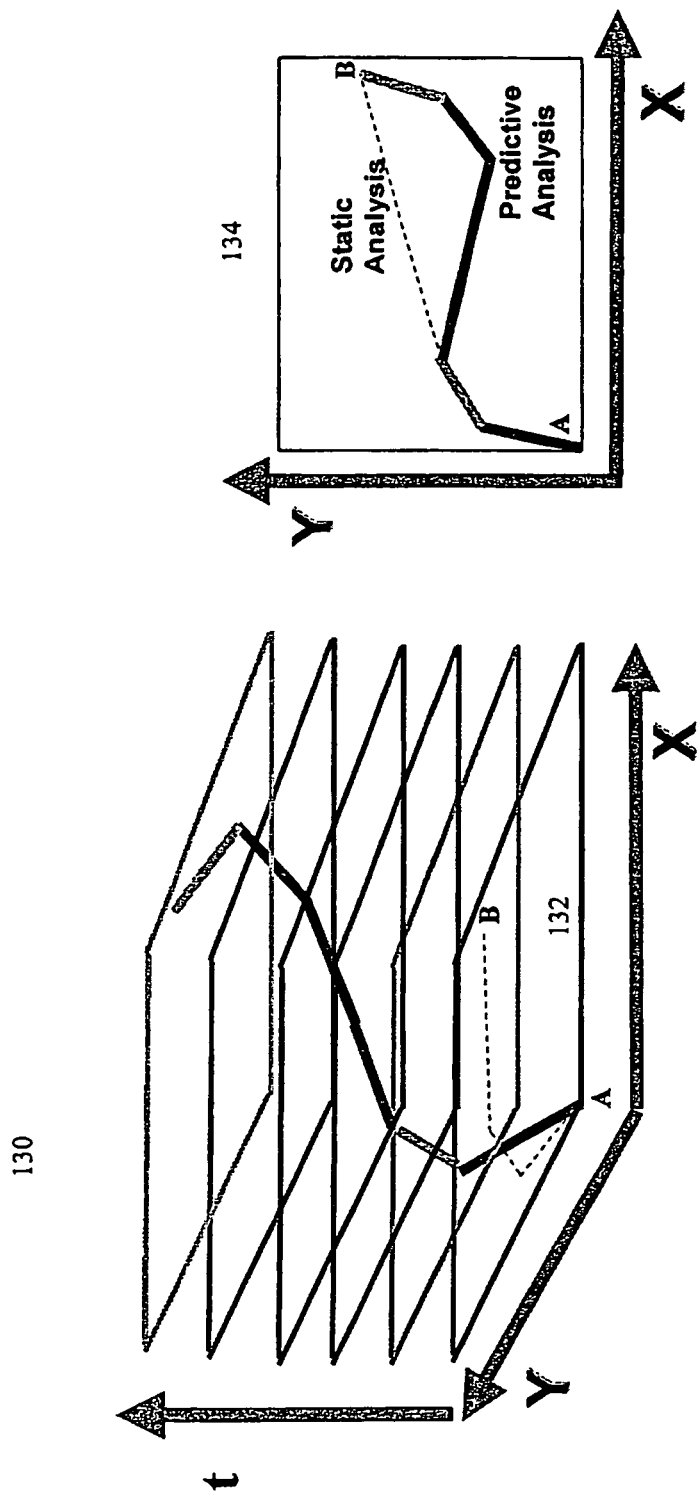
FIG 7 - Three dimensional model usage in route recommendation

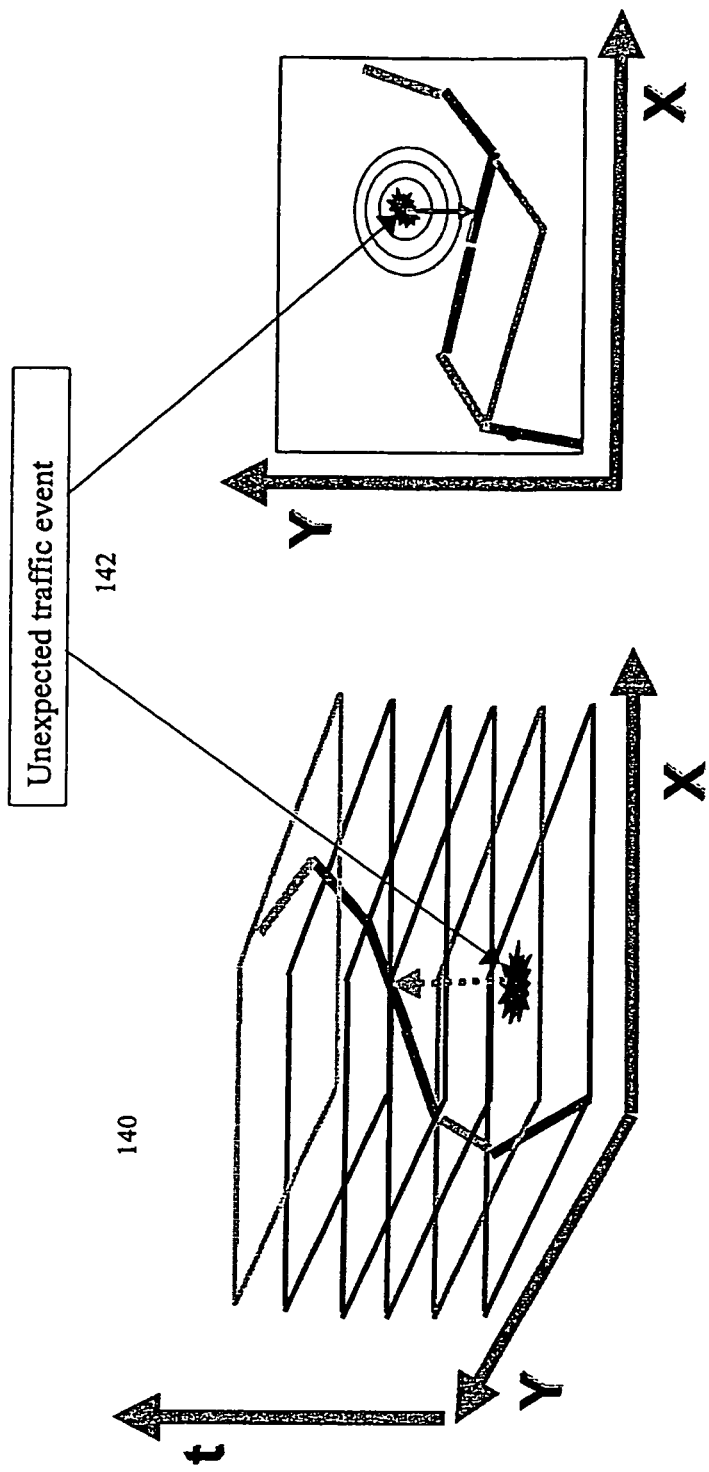
FIG 8 - Three dimensional model usage in traffic alerts

METHOD AND SYSTEM FOR MODELING AND PROCESSING VEHICULAR TRAFFIC DATA AND INFORMATION AND APPLYING THEREOF

This application is a Continuation of U.S. patent application Ser. No. 10/999,994 filed 1 Dec. 2004, which is a Divisional of U.S. patent application Ser. No. 10/461,478 filed Jun. 16, 2003, now U.S. Pat. No. 6,879,907 which is a Continuation of U.S. patent application Ser. No. 09/939,620 filed Aug. 28, 2001, now U.S. Pat. No. 6,587,781, which claims priority from U.S. Provisional Application No. 60/227,905, filed Aug. 28, 2000, all of which applications are hereby incorporated herein by reference.

FIELD AND BACKGROUND OF THE INVENTION

The present invention relates to the field of vehicular traffic data and information and, more particularly, to a method and system for modeling and processing vehicular traffic data and information, and using the modeled and processed vehicular traffic data and information for providing a variety of vehicular traffic related service applications to end users.

Despite continuing investing in massive amounts of financial and human resources, current road network capacities insufficiently meet the needs dictated by current levels and growth rates of traffic volume. This dilemma relates to current road network capacities, in general, and current road network capacities in urban, suburban, and rural, environments, in particular. Road congestion, or, equivalently, inconveniently high levels or volumes of vehicular road traffic, is a persistent major factor resulting from this dilemma, and needs to be given proper attention and taken into account for efficiently scheduling trips, selecting travel routes, and for attempting to efficiently allocate and exploit time, by individual drivers, as well as by vehicular traffic logistics personnel such as company vehicular fleet managers, responsible for performing such activities. Road congestion and associated traffic data and information also need to be well understood and used by a wide variety of public and private occupations and personnel, such as designers, planners, engineers, coordinators, traffic law makers and enforcers, directly and/or indirectly involved in designing, planning, controlling, engineering, coordinating, and implementing, a wide variety of activities, events, and/or construction projects, which depend upon accurate descriptions of current and future vehicular traffic situations and scenarios. This situation is a main driving force for the on-going development and application of various methods, systems, and devices, for acquiring, analyzing, processing, and applying, vehicular traffic data and information.

There are various prior art techniques for acquiring, analyzing, processing, and applying, vehicular traffic data and information. A few examples of recent prior art in this field are U.S. Pat. No. 6,236,933, issued to Lang, entitled "Instantaneous Traffic Monitoring System", U.S. Pat. No. 6,012,012, issued to Fleck et al., entitled "Method And System For Determining Dynamic Traffic Information", U.S. Pat. No. 6,240,364, issued to Kemer et al., entitled "Method And Device For Providing Traffic Information", and, U.S. Pat. No. 5,845,227, issued to Peterson, entitled "Method And Apparatus For Providing Shortest Elapsed Time Route And Tracking Information To Users".

Prior art techniques typically include calculating velocities of vehicles, for example, by acquiring series of exact locations of the vehicles located along roads in known time intervals, by measuring vehicular traffic flux along roads, especially, along highways, and/or, by a variety of other means known in the field. There are prior art techniques which are either based on, or, include, the use of networks of fixed or static traffic sensors or electronic devices, such as video cameras, induction boxes, tag readers, traffic detectors, and so on, which are installed and fixed along known locations of main traffic arteries and/or traffic volume. Fixed or static traffic sensors or electronic devices, positioned at known locations, relay crossing times of vehicles to a computerized central traffic data and information handling (gathering, collecting, acquiring, analyzing, processing, communicating, distributing) system that consequently calculates velocities of the vehicles between two such sensors.

Significant limitations of developing and implementing comprehensive, highly accurate and precise, techniques for acquiring, analyzing, processing, and applying, vehicular traffic data and information, primarily based upon a system or network of fixed or static traffic sensors or electronic devices, are the relatively large amounts and expense of the necessary infrastructure and maintenance, especially if such resources are to account for and include vehicular traffic data and information associated with a plethora of minor roads characterized by low volumes of vehicular traffic.

More recent prior art techniques are either based on, or, at least include, the use of mobile sensors or electronic devices physically located in or attached to vehicles, each of which is uniquely or specifically designated or assigned to a particular vehicle, whereby the mobile sensors or electronic devices automatically transmit vehicle locations to the computerized central traffic data and information handling system according to pre-determined time intervals, and, whereby, vehicle velocities are relatively simple to calculate for vehicle locations acquired with sufficient accuracy.

For obtaining dynamic vehicle location and velocity data and information, having varying degrees of accuracy and precision, from uniquely or specifically dedicated in-vehicle mobile sensors or electronic devices, such prior art techniques make use of well known global positioning system (GPS) and/or other types of mobile wireless communication or electronic vehicular tracking technologies, such as cellular telephone or radio types of mobile wireless communications networks or systems, involving the use of corresponding mobile wireless devices such as cellular telephones, laptop computers, personal digital assistants (PDAs), transceivers, and other types of telemetric devices, which are uniquely or specifically designated or assigned to a particular vehicle. Establishing and maintaining various communications of the mobile sensors or electronic devices, the computerized central traffic data and information handling system, and, vehicular end-users, are also performed by mobile wireless communication networks or systems, such as cellular telephone mobile wireless communications networks or systems, for example, involving the Internet.

It is noted, however, that due to the requirement of uniquely or specifically designating or assigning each mobile sensor or electronic device to a particular vehicle during the process of gathering, collecting, or acquiring, the vehicular traffic data and information, the potential number of mobile sensors or electronic devices providing dynamic vehicle location and velocity data and information to the computerized central traffic data and information handling system is limited, in proportion to the number of vehicles featuring the particular mobile wireless communication or electronic vehicular tracking technology. For example, currently, there is a significantly larger potential number of vehicles associated with cellular telephone types of a mobile wireless communication network or system compared to the potential number of vehicles associated with GPS types of a mobile wireless communication network or system.

Various specific techniques for manually and electronically gathering, collecting, or acquiring, vehicular traffic data and information are relatively well developed and taught about in the prior art. Moreover, various specific techniques for electronically communicating, sending, or distributing, analyzed and processed vehicular traffic data and information in vehicular traffic related service applications to end users are also relatively well developed and taught about in the prior art. However, there remains a strong on-going need for developing better, more comprehensive, highly accurate and precise, yet, practicable and implementable techniques for analyzing, modeling, and processing, the acquired, collected, or gathered, vehicular traffic data and information. This last aspect is especially true with regard to using vehicular traffic data and information for comprehensively, yet, accurately and practicably, describing current and predicting future vehicular traffic situations and scenarios, from which vehicular traffic data and information are used for providing a variety of vehicular traffic related service applications to end users.

In the prior art, a critically important aspect requiring new and improved understanding and enabling description for developing better, more comprehensive, highly accurate and precise, yet, practicable and implementable techniques for analyzing, modeling, and processing, the acquired, collected, or gathered, vehicular traffic data and information, relates to the use of a geographical information system (GIS), or, other similarly organized and detailed spatial representation of a network of roads, for a particular local or wide area region, within which the vehicular traffic data and information are acquired, collected, or gathered. In particular, there is a need for properly and efficiently 'spatially' modeling a road network, and, properly and efficiently 'spatially' modeling, interrelating, and correlating, the vehicular traffic data and information which are acquired, collected, or gathered, among a plurality of sub-regions, sub-areas, or, other designated sub-divisions, within the particular local or wide area region of the spatially modeled road network. Furthermore, there is a particular need for incorporating the factor or dimension of time, for properly and efficiently 'spatially and temporally' defining, interrelating, and correlating, the vehicular traffic data and information which are acquired, collected, or gathered, among the plurality of sub-regions, sub-areas, or, other designated sub-divisions, within the particular local or wide area region of the spatially modeled road network.

In the prior art, another critically important aspect requiring new and improved understanding and enabling description relates to the modeling and processing of vehicular traffic data and information which are acquired, collected, or gathered, using techniques based on cellular telephone types of mobile wireless communications networks or systems, which to date, feature relatively low accuracy and precision of vehicle locations compared to the less widely used, but significantly more highly accurate and precise, GPS types of mobile wireless communication or electronic vehicular tracking technologies.

In prior art, another critically important aspect requiring new and improved understanding and enabling description relates to the modeling and processing of vehicular traffic data and information which are acquired, collected, or gathered, from an 'arbitrary', non-pre-determined or non-designated, population or group of vehicles each including a uniquely or specifically designated or assigned mobile sensor or electronic device, therefore, resulting in a potentially large number of mobile sensors or electronic devices providing dynamic vehicle location and velocity data and information to the computerized central traffic data and information handling system.

In the prior art, another critically important aspect requiring new and improved understanding and enabling description relates to the proper and efficient combining or fusing of a variety of vehicular traffic data and information which are acquired, collected, or gathered, using a combination of a various techniques based on networks of fixed or static traffic sensors or electronic devices, GPS and/or cellular telephone types of mobile wireless communications networks or systems, and, various other manual and electronic types of vehicular traffic data and information such as historical and/or event related vehicular traffic data and information.

In the prior art, another important aspect requiring understanding and enabling description relates to techniques for protecting the privacy of individuals associated with or hosting the sources, that is, the mobile sensors or electronic devices, of vehicular traffic data and information which are acquired, collected, or gathered, using techniques based on GPS and/or cellular telephone types of mobile wireless communications networks or systems. The inventors are unaware of any prior art teaching for performing this in the field of vehicular traffic data and information.

There is thus a strong need for, and it would be highly advantageous to have a method and system for modeling and processing vehicular traffic data and information, and using the modeled and processed vehicular traffic data and information for providing a variety of vehicular traffic related service applications to end users. Moreover, there is a particular need for such a generally applicable method and system with regard to using vehicular traffic data and information for comprehensively, yet, accurately and practicably, describing current and predicting future vehicular traffic situations and scenarios, from which vehicular traffic data and information are used for providing the variety of vehicular traffic related service applications to the end users.

SUMMARY OF THE INVENTION

The present invention relates to a method and system for modeling and processing vehicular traffic data and information, and using the modeled and processed vehicular traffic data and information for providing a variety of vehicular traffic related service applications to end users. The present invention especially includes features for using vehicular traffic data and information for comprehensively, yet, accurately and practicably, describing current and predicting future vehicular traffic situations and scenarios, from which vehicular traffic data and information are used for providing the variety of vehicular traffic related service applications to the end users.

Thus, according to the present invention, there is provided a method and a system for modeling and processing vehicular traffic data and information, comprising: (a) transforming a spatial representation of a road network into a network of spatially interdependent and interrelated oriented road sections, for forming an oriented road section network; (b) acquiring a variety of the vehicular traffic data and information associated with the oriented road section network, from a variety of sources; (c) prioritizing, filtering, and controlling, the vehicular traffic data and information acquired from each of the variety of sources; (d) calculating a mean normalized travel time (NTT) value for each oriented road section of said oriented road section network using the prioritized, filtered, and controlled, vehicular traffic data and information associated with each source, for forming a partial current vehicular traffic situation picture associated with each source; (e) fusing the partial current traffic situation picture associated with each source, for generating a single complete current vehicular traffic situation picture associated with entire oriented road section network; (f) predicting a future complete vehicular traffic situation picture associated with the entire oriented road section network; and (g) using the current vehicular traffic situation picture and the future vehicular traffic situation picture for providing a variety of vehicular traffic related service applications to end users.

The present invention successfully overcomes all the previously described shortcomings and limitations of presently known techniques for analyzing, modeling, and processing, the acquired, collected, or gathered, vehicular traffic data and information. Especially with regard to using vehicular traffic data and information for comprehensively, yet, accurately and practicably, describing current and predicting future vehicular traffic situations and scenarios, from which vehicular traffic data and information are used for providing a variety of vehicular traffic related service applications to end users. Another important benefit of the present invention is that it is generally applicable and complementary to various different 'upstream' prior art techniques of gathering, collecting, or acquiring, vehicular traffic data and information, and, generally applicable and complementary to various different 'downstream' prior art techniques of electronically communicating, sending, or distributing, the analyzed, modeled, and processed, vehicular traffic data and information in vehicular traffic related service applications to end users.

Implementation of the method and system for modeling and processing vehicular traffic data and information, and using the modeled and processed vehicular traffic data and information for providing a variety of vehicular traffic related service applications to end users, according to the present invention, involves performing or completing selected tasks or steps manually, automatically, or a combination thereof. Moreover, according to actual instrumentation and/or equipment used for implementing a particular preferred embodiment of the disclosed invention, several selected steps of the present invention could be performed by hardware, by software on any operating system of any firmware, or a combination thereof. In particular, as hardware, selected steps of the invention could be performed by a computerized network, a computer, a computer chip, an electronic circuit, hard-wired circuitry, or a combination thereof, involving any number of digital and/or analog, electrical and/or electronic, components, operations, and protocols. Additionally, or alternatively, as software, selected steps of the invention could be performed by a data processor, such as a computing platform, executing a plurality of computer program types of software instructions or protocols using any suitable computer operating system.

BRIEF DESCRIPTION OF THE DRAWINGS

The invention is herein described, by way of example only, with reference to the accompanying drawings, wherein:

FIG. 1 is a block flow diagram of a preferred embodiment of the method and system for modeling and processing vehicular traffic data and information, and using the modeled and processed vehicular traffic data and information for providing a variety of vehicular traffic related service applications to end users, in accordance with the present invention;

FIG. 2 is a schematic diagram illustrating a preferred embodiment of modeling a road network in terms of 'oriented road sections' as part of, and in relation to, oriented road section network 14 of method/system 10 of FIG. 1, in accordance with the present invention;

FIG. 3 is a pictorial diagram illustrating exemplary results obtained from the process of path identification using vehicular traffic data and information acquired from mobile sensors of a cellular phone mobile communication network, in accordance with the present invention;

FIG. 4 is a pictorial diagram illustrating exemplary results obtained from the process of path identification using vehicular traffic data and information acquired from mobile sensors of an anti-theft mobile communication network, in accordance with the present invention;

FIG. 5 is a schematic diagram illustrating a partial current vehicular traffic situation picture featuring current NTT values obtained from an exemplary network source of mobile sensor vehicular traffic data and information, and indicated for each oriented road section of an exemplary part of an oriented road section network, in accordance with the present invention;

FIG. 6 is a graph illustrating an example of vehicular traffic behavior associated with an exemplary oriented road section, in terms of different NTT values plotted as a function of time, in accordance with the present invention;

FIG. 7 is a graphical diagram illustrating usage of a three-dimensional vehicular traffic situation picture for providing route recommendation types of traffic related service applications to end users, in accordance with the present invention; and FIG. 8 is a graphical diagram illustrating usage of a three-dimensional vehicular traffic situation picture for providing traffic alerts and alternative route recommendation types of traffic related service applications to end users, in accordance with the present invention.

DESCRIPTION OF THE PREFERRED EMBODIMENTS

The present invention takes priority from U.S. Provisional Patent Application No. 60/227,905, filed Aug. 28, 2000, entitled "Dynamic Traffic Flow Forecasting, Using Large Volumes Of Privacy Protected Location Data", the teachings of which are incorporated by reference as if fully set forth herein.

The present invention relates to a method and system for modeling and processing vehicular traffic data and information, and using the modeled and processed vehicular traffic data and information for providing a variety of vehicular traffic related service applications to end users. The present invention especially includes features for using vehicular traffic data and information for comprehensively, yet, accurately and practicably, describing current and predicting future vehicular traffic situations and scenarios, from which vehicular traffic data and information are used for providing the variety of vehicular traffic related service applications to the end users.

The present invention features several aspects of novelty and inventive step over the prior art, for developing better, more comprehensive, highly accurate and precise, yet, practicable and implementable techniques for analyzing, modeling, and processing, the acquired, collected, or gathered, vehicular traffic data and information. Several main aspects of the present invention are briefly described herein. These and additional aspects of the present invention are described in more detail thereafter.

One main aspect of the present invention relates to the adaptation and modeling of a geographical information system (GIS), or, other similarly organized and detailed spatial representation of a network of roads, for a particular local or wide area region, within which the vehicular traffic data and information are acquired, collected, or gathered. In particular, there is efficiently 'spatially' modeling the road network, in order to accommodate and fit the variety of vehicular traffic data and information, while limiting the amount of data and information needed to be stored and handled. By way of this adaptation and modeling of a road network, especially a GIS type of road network, there is also properly and efficiently 'spatially' modeling, interrelating, and correlating, the vehicular traffic data and information which are acquired, collected, or gathered, among a plurality of sub-regions, sub-areas, or, other designated sub-divisions, within the particular local or wide area region of the spatially defined road network. Furthermore, there is incorporating the factor or dimension of time, for properly and efficiently 'spatially and temporally' defining, interrelating, and correlating, the vehicular traffic data and information which are acquired, collected, or gathered, among the plurality of sub-regions, sub-areas, or, other designated sub-divisions, within the particular local or wide area region of the spatially defined road network.

Another main aspect of the present invention relates to the modeling and processing of vehicular traffic data and information which are acquired, collected, or gathered, using techniques based on mobile wireless communications networks or systems, such as cellular telephone types of networks and systems, which to date, feature relatively low accuracy and precision of vehicle locations compared to the less widely used, but significantly more highly accurate and precise, GPS types of mobile wireless communication or electronic vehicular tracking technologies.

Another main aspect of the present invention relates to the modeling and processing of vehicular traffic data and information which are acquired, collected, or gathered, from an 'arbitrary', non-pre-determined or non-designated, population or group of vehicles each including a uniquely or specifically designated or assigned mobile sensor or electronic device, therefore, resulting in a potentially large number of mobile sensors or electronic devices providing dynamic vehicle location and velocity data and information to the computerized central traffic data and information handling system.

Another main aspect of the present invention relates to efficient combining or fusing of a variety of vehicular traffic data and information which are acquired, collected, or gathered, using a combination of various techniques based on networks of fixed or static traffic sensors or electronic devices, mobile wireless communications networks or systems such as GPS and/or cellular telephone networks or systems, and, various other manual and electronic types of vehicular traffic data and information such as traffic reports, incorporating in the fusion process the historical and/or event related vehicular traffic data and information that is accumulated, analyzed, and processed, from previously accumulated vehicular traffic data and information in the same system.

Another main aspect of the present invention relates to techniques for protecting the privacy of individuals associated with or hosting the sources, that is, the mobile sensors or electronic devices, of vehicular traffic data and information which are acquired, collected, or gathered, using techniques based on GPS and/or cellular telephone types of mobile wireless communications networks or systems. The inventors are unaware of any prior art teaching for performing this in the field of vehicular traffic data and information.

It is to be understood that the present invention is not limited in its application to the details of the order or sequence of steps of operation or implementation of the method, or, to the details of construction and arrangement of the various devices and components of the system, set forth in the following description and drawings. For example, the following description refers to a cellular telephone type of mobile wireless communication network or system as the primary source of electronically acquired vehicular data and information, in order to illustrate implementation of the present invention. As indicated below, additionally, or, alternatively, other types of mobile wireless communication networks or systems function as sources of electronically acquired vehicular data and information. Accordingly, the invention is capable of other embodiments or of being practiced or carried out in various ways. Also, it is to be understood that the phraseology and terminology employed herein are for the purpose of description and should not be regarded as limiting.

Steps, components, operation, and implementation of a method and system for modeling and processing vehicular traffic data and information, and using the modeled and processed vehicular traffic data and information for providing a variety of vehicular traffic related service applications to end users, according to the present invention are better understood with reference to the following description and accompanying drawings. Throughout the following description and accompanying drawings, like reference numbers refer to like elements.

Referring now to the drawings, FIG. 1 is a block flow diagram of a preferred embodiment of the method and system, hereinafter, generally referred to as method/system 10, of the present invention. Terminology and referenced items appearing in the following description of FIG. 1 are consistent with those used in FIGS. 1 through 8.

In Step (a) of the method of the present invention, there is transforming a spatial representation of a road network into a network of spatially interdependent and interrelated oriented road sections, for forming an oriented road section network.

Specifically, there is transforming a spatial representation of a road network 12 into a network of spatially interdependent and interrelated oriented road sections, for forming an oriented road section network 14. Preferably, road network 12 is a geographical information system (GIS) type of road network 12, which is well known in the art of vehicular road traffic data and information. Typically, a GIS type of road network 12 is a detailed spatial representation of a road network encompassing a particular local or wide area region, within which are a plurality of sub-regions, sub-areas, or, other designated sub-divisions, such as roads, turns, junctions, and, areas or regions of variably populated streets and roads. Associated with road network 12, and consequently, oriented road section network 14, are the vehicular traffic data and information which are acquired, collected, or gathered, among the plurality of sub-regions, sub-areas, or, other designated sub-divisions. Step (a) corresponds to an initialization step when method/system 10 is applied to a new geographical region or road network 12. Vehicular traffic data and information are subsequently added, by various manual and/or electronic means, to the oriented road section network 14 model of a GIS type of road network 12.

The approach of the present invention to the field of vehicular traffic data and information, in general, and to the problematic situation of vehicular traffic congestion, in particular, is from a 'holistic' point of view, emphasizing the importance of an entire road network 12 encompassing a particular local or wide area region, and the interdependence and interrelation of the plurality of sub-regions, sub-areas, or, other designated sub-divisions of road network 12. This is accomplished by adapting and transforming a spatial representation of road network 12 into a network of spatially interdependent and interrelated oriented road sections, for forming oriented road section network 14. This process is conceptually analogous to transforming road network 12 into an intertwined weave of oriented road sections, for forming oriented road section network 14.

FIG. 2 is a schematic diagram illustrating a preferred embodiment of modeling a road network in terms of 'oriented road sections' as part of, and in relation to, oriented road section network 14 of method/system 10 of FIG. 1. In the upper part of FIG. 2, direction of vehicular traffic flow is indicated by the arrows drawn inside the road segments and inside the road junctions. Herein, the term 'road section', in general, represents a unit featuring at least one consecutive road segment of a road network, preferably, a GIS type of road network, where the at least one road segment, positioned head-to-tail relative to each other, are located between two road junctions, referred to as a tail end road junction and a head end road junction, within the road network, and are characterized by similar vehicular traffic data and information. In practice, typically, a 'road section' represents a unit featuring a set of a plurality of consecutive road segments of a road network, preferably, a GIS type of road network, where the consecutive road segments, positioned head-to-tail relative to each other, are located between two road junctions, a tail end road junction and a head end road junction, within the road network, and are characterized by similar vehicular traffic data and information. For purposes of effectively modeling a particular road network, a plurality of road segments are therefore combined into a single homogeneous or uniform road section characterized by homogeneous or uniform vehicular traffic data and information. Accordingly, the road network is modeled as a plurality of road sections.

Accordingly, in the upper part of FIG. 2, generally indicated as 15, a road section, as a first example, road section 16, represents a unit featuring a set of a plurality of, for example, two, consecutive road segments 18 and 20 of a road network (12 in FIG. 1, partly shown in FIG. 2), where consecutive road segments 18 and 20 are positioned head-to-tail relative to each other, are located between two road junctions, in particular, head end road junction 22 and tail end road junction 24, within the road network, and are characterized by similar vehicular traffic data and information. As a second example, road section 26, represents a unit featuring a set of a plurality of, for example, three, consecutive road segments 28, 30, and, 32, within the same road network (12 in FIG. 1, partly shown in FIG. 2), where consecutive road segments 28, 30, and, 32, are positioned head-to-tail relative to each other, are located between two road junctions, in particular, head end road junction 34 and tail end road junction 22, within the road network, and are characterized by similar vehicular traffic data and information.

Two additional examples, relating to the two directions of a bi-directional street, of a road section, are road section 36 and road section 38, each representing a single consecutive road segment 40, within the road network (12 in FIG. 1, partly shown in FIG. 2), where consecutive road segment 40 is positioned head-to-tail (relative to itself and oppositely for each of the two directions), located between two road junctions, in particular, head end road junction 42 and tail end road junction 22, and, head end road junction 22 and tail end road junction 42, respectively, within the road network, and each is characterized by a particular vehicular traffic data and information, according to each of the two directions, respectively.

Herein, the term 'oriented road section' represents a road section having a single vehicular traffic continuation option located at the head end road junction. Herein, a single vehicular traffic continuation option refers to one of the various vehicular traffic flow options a vehicle may take, such as optionally continuing to travel straight, optionally taking a right turn, or, optionally taking a left turn, from a particular road segment joined or linked to the head end road junction. Accordingly, a vehicular traffic continuation option is selected from the group consisting of continuing to travel straight, taking a right turn, and, taking a left turn, from a particular road segment joined or linked to the head end road junction.

Accordingly, in the lower part of FIG. 2, generally indicated as 50, shown are eight oriented road sections, that is, oriented road sections 16a, 16b, 16c, associated with road section 16; oriented road sections 26a and 26b, associated with road section 26; oriented road section 36a, associated with road section 36; and, oriented road sections 38a and 38b, associated with road section 38. Each oriented road section has a single vehicular traffic continuation option, that is, a vehicular traffic continuation option selected from the group consisting of continuing to travel straight, taking a right turn, and, taking a left turn, from the particular road segment joined or linked to the associated head end road junction, as shown by the arrows in the lower part of FIG. 2, corresponding to the arrows in the upper part of FIG. 1, indicating direction of vehicular traffic flow drawn inside the road segments and inside the road junctions.

An equally alternative way of defining the term oriented road section is that, a road section having a head end road junction with a particular plurality of vehicular traffic continuation options is split or divided into that particular plurality of oriented road sections. Accordingly, in FIG. 2, for example, road section 16 having head end road junction 22 with a plurality of three vehicular traffic continuation options, that is, vehicular traffic continuation option 16a (continuing to travel straight), 16b (taking a right turn), and, 16c (taking a left turn), is split or divided into a plurality of three oriented road sections 16a, 16b, and 16c, respectively.

When special lanes in the various road segments within the oriented road section network are assigned to turning traffic, the respective oriented road sections may yield different vehicular traffic data and information, such as different values relating to road congestion or heavy vehicular traffic volume. This representation of a road network enables the incorporation of interdependence and interrelation among the plurality of road segments, the plurality of road sections, and, the plurality of oriented road sections. In particular, the oriented road section network model of a road network accounts for the significant influence of road junctions on vehicular traffic flow and associated travel time delays. Moreover, there is strong interdependence and interrelation between any given particular oriented road section characterized by a particular traffic situation or scenario and other oriented road sections in the same vicinity, either crossing or parallel to the particular oriented road section.

In Step (b), there is acquiring a variety of vehicular traffic data and information associated with the oriented road section network, from a variety of sources.

An important aspect of the present invention is the ability to model and process a wide variety of vehicular traffic data and information, in particular, which are used for generating current and future vehicular traffic situation pictures. Referring to method/system 10 of FIG. 1, sources of vehicular traffic data and information are selected from the group consisting of sources 60 of fixed sensors, sources 62 of mobile sensors, sources 64 of traffic reports by police or radio broadcasts of vehicular traffic data and information, other sources 66, and combinations thereof. Each of the variety of acquired, collected, or, gathered, vehicular traffic data and information, is characterized by a variable level of accuracy, and is independent of any other specific characteristics of the corresponding source.

Systems of fixed sensors and traffic reports of historical and/or event related vehicular traffic data and information are presently the most common sources of vehicular traffic data and information, and are well known in the art of vehicular traffic data and information. However, the present invention features mobile sensors as most advantageous for acquiring vehicular traffic data and information, even though they have lower confidence levels. A growing number of mobile wireless communication devices are increasingly being installed or carried in vehicles, and are capable of transmitting vehicular locations to a computerized central data and information receiving and processing system. Such mobile wireless communication devices are telemetric devices with GPS capabilities, anti-theft devices, and, driver-carried devices such as computer laptops and cellular phones. The respective computerized central data and information receiving and processing systems have capabilities of locating these devices, and act as sources of vehicular traffic data and information for assessing traffic situations. The variability of these devices and the spreading popularity of some of them leads to an abundant and widespread population of mobile sensors. However, some of these systems, such as a cellular telephone wireless communication networks, have poor location accuracy, and therefore require elaborate and unique processing in order to extract useful vehicular traffic data and information.

In principle, method/system 10 of the present invention is applicable to all types of mobile sensor systems, and models and processes the variability of location accuracy, vehicular traffic movement data and information, reading time intervals, and other types of vehicular traffic data and information as further described below. Method/system 10 acquires vehicular traffic data and information from several such sources in parallel and combines or fuses the acquired vehicular traffic data and information into one coherent and complete vehicular traffic situation picture.

Acquiring the vehicular traffic data and information from a mobile sensor system is performed by tracking a sample of mobile sensors 62 (FIG. 1) that are carried in moving vehicles. Locations of mobile sensors 62 are obtained from the mobile network in known time intervals, and accordingly, the path of the vehicle is identified in terms of a plurality of oriented road sections featured in the oriented road section network, for example, the plurality of exemplary oriented road sections shown in FIG. 2 featured in oriented road section network 14 (FIG. 1), and the velocity of a given vehicle on the different road sections of the identified path are calculated. A statistical processing of the velocities of all mobile sensors 62 that traveled on a specific oriented road section during the time period of an assessment cycle yields a normalized travel time (NTT) value, hereinafter, also referred to as an NTT value, on that specific oriented road section, where the normalized travel time refers to a travel time normalized with respect to a pre-determined distance, for example, in a non-limiting fashion, normalized with respect to a distance having a range of between about 10 meters to about 100 meters, preferably, a distance of 100 meters. When more than one such NTT value is calculated, a possibility of different velocities on different lanes of a particular oriented road section is indicated.

In Step (c), there is prioritizing, filtering, and controlling, the vehicular traffic data and information acquired from each of the variety of sources.

In this step of implementing method/system 10, consideration is given to various aspects relating to prioritizing, filtering, and controlling, the vehicular traffic data and information acquired from each of the variety of sources. For example, filtering noise corresponding to irrelevant sensors and erroneous data.

With respect to the choice of the sampled mobile sensor devices, sampling policy or prioritizing the variety of vehicular traffic data and information, and controlling the sampling of the vehicular traffic data and information, statistical consideration show that a very small percentage, approximately 1-2%, of moving vehicles provide a sufficient base to obtain the necessary data. The number of moving sensors is, however, huge, and there is need to efficiently choose the sample population, to decide on a sampling policy, and to control its carrying out, so that the data collected will be as relevant as possible for the purpose of vehicular traffic assessment.

The choice of sample units is done by making sure that they are in high probability moving-vehicle-carried. In cellular telephone networks, this is done by identifying phones whose cell-handover rates indicate a relatively fast movement. A parallel procedure is performed for any mobile sensor source. In mobile anti-theft systems, for example, vehicular ignition activation is a valid indicator of 'movement-suspicion'. This initial choice of sensor population assures, for example, that pedestrians will not be included, and so prevents, along the track, the confusion between walking pedestrians and slowing traffic due to heavy congestion.

Data acquisition from cellular phones is controlled by a server connected to a particular cellular phone network. The operation of cellular phones provokes a large amount of administrative and control messages that flow in the cellular phone network whenever any cellular 'event' occurs. For example, initiation of a call, completion of a call, transmission of a short message service (SMS) message, a cell transition or handover, etc. The server of the cellular phone network monitors these messages and intercepts those that indicate 'movement' of cellular phone holders, for example, phones whose cell handovers rate can point to a vehicle speed.

Those cellular phones that are suspected as being 'vehicle-carried' are immediately tracked for their locations using the handovers themselves as 'footprints' or 'footsteps', and/or other locating capability of the cellular phone network. Different particular cellular phone networks use different locating techniques and systems, each having a different characteristic locating accuracy. Method/system 10 is independent of specific locating techniques and systems, and is suited to a variability of accuracy and precision levels. For example, a common difficulty concerning locating accuracy and precision of a mobile sensor network is the phenomenon of 'noise', such as that caused by reflections, low cell-efficiency management, and/or, even errors. As a result of this, a substantial number of the footprints is erroneous, whereby they do not represent real or actual sensor locations.

The tracking of the 'moving' phones is done by polling their locations in known time intervals. This operation is controlled by Sampler software module 1 indicated in FIG. 1. Sampler software module 1 regulates the sampling so that it will be most efficient. Specifically, for example, Sampler software module 1 (i) filters out cellular phones that are recognized as 'noise', (ii) prioritizes the vehicular traffic data and information acquisition according to policy or present vehicular traffic circumstances, (iii) prevents tracking cellular phones that stopped moving, and, (iv) maintains the sampling procedure within the locating capacity of the particular cellular phone network.

Once the 'moving' sensors are identified, method/system 10 includes them in the sample population and controls the flow of the vehicular traffic data and information according to actual features and capabilities of method/system 10, in general, and of Sampler software module 1, in particular, and, according to changing locations of the moving sensors along their respective paths. For example, Sampler software module 1 obtains the vehicular traffic data and information by 'push' or 'pull' procedures, that is, where 'push' is a mode of receiving the vehicular traffic data and information that is initiated by source 62 of the mobile sensors, and, where 'pull' is a mode of receiving the vehicular traffic data and information when the initiator is Sampler software module 1. This tracking operation is controlled by method/system 10 according to a predefined and updated policy. For instance, according to a policy of 'not to track too many vehicles in a same region', 'focus the tracking on a certain problematic region', 'stop tracking a vehicle that stopped for a predetermined time interval', and, 'collect vehicular traffic data and information within a certain limited capacity of the cellular phone network'.

As previously indicated, a main aspect of the present invention relates to techniques for protecting the privacy of individuals associated with, or hosting, the sources 62 (FIG. 2) of the mobile sensors or electronic devices, of the vehicular traffic data and information which are acquired, collected, or gathered, using techniques based on GPS and/or cellular telephone types of mobile wireless communications networks or systems. Tracking vehicles without the knowledge and consent of their drivers may be considered as violation of privacy. Method/system 10, in general, and technical architecture of method/system 10, in particular, are designed for deleting identities of the associated sample units, and for deleting individual sensor tracks once their derived velocities are incorporated into calculations and processing associated with the plurality of oriented road sections within oriented road section network 14.

Moreover, these processing steps take place in a server that is connected to the mobile sensor source network. When more than one mobile sensor source provides vehicular traffic data and information to method/system 10, such a server is in communication with each of the data providers. Tracked vehicles are not identified by using phone numbers. Even within the short tracking times, mobile sensor identities are kept within the location of the cellular phone network, so that during the whole process, privacy of cellular phone users is protected.

In Step (d), there is calculating a mean normalized travel time (NTT) value for each oriented road section of the oriented road section network using the prioritized, filtered, and controlled, vehicular traffic data and information associated with each source, for forming a partial current vehicular traffic situation picture associated with each source.

Prioritized, filtered, and controlled, vehicular traffic data and information associated with each source are transmitted from Sampler software module 1 to NTT calculator software module 2, as indicated in FIG. 1. In this step of implementing method/system 10 (FIG. 1), consideration is given to assessment of normalized travel times (NTTs) values on oriented road sections, from individual calculated values of NTTs, and, to inaccuracy problems relating to identifying the path of a sample, and in extracting and calculating the NTT values.

Data from fixed sensors are usually received in terms of velocity or NTT values. Transition of these values for processing according to the model of method/system 10 of the present invention is straightforward to one of ordinary skill in the art, and is not further described herein. Vehicular traffic data and information obtained from traffic reports are handled manually and used for determining specific NTT values on oriented road sections or the specific patterns to be used. Vehicular traffic data and information from mobile sensor sources is processed in a more elaborate way. As previously indicated, above, in this description of the preferred embodiments, source 62 of the plurality of mobile sensors is represented as a cellular phone network, being the most complex one, but is generally applicable to other mobile wireless communication networks or systems operating with a plurality of mobile sensors or electronic devices.

Specifically applicable to vehicular traffic data and information associated with the mobile cellular phone network source, there is identifying a path taken by each vehicle and calculating a mean normalized travel time (NTT) value for each oriented road section of oriented road section network 14 (FIG. 1) using the prioritized, filtered, and controlled vehicular traffic data and information, for forming a partial current vehicular traffic situation picture associated with the cellular phone network source.

Location readings acquired from mobile sensor networks are the 'footprints' of the sensor's track. When footprints are inaccurate, they are represented by geometrical areas, whose form and size depend on the particular features of the locating method. In cellular phone networks, footprints can be the cells themselves, with or without time-advance data, and their graphic representation is by segments of circle sectors whose coverage can reach dimensions between tens and thousands of meters. Another type of footprint associated with cellular phone networks is a cell-handover, whose graphic representation is dictated by the relative position of the two cells involved in the 'handover'.

Specific characteristics of the location data obtained from the variety of mobile sensor networks varies with the network, whereby, method/system 10 accounts for them in a generic way, by implementing statistical methods and algorithms that rely on some assumptions as to the reasonable behavior of vehicular drivers. The path of the vehicle is deduced out of several consecutive readings. The deduced path is the sequence of connected oriented road sections that cross the location areas in the order of their appearance, and which join into a logical route to take between two points. In this step, some of the 'noise' is discovered, for example, footprints that went beyond bounds of a 'sensible' travel route. Additionally, those mobile sensors that are not relevant, for example, those carried in trains, are also identified. Those single footprints or irrelevant sample units are immediately rejected and their tracking is stopped.

The NTTs of the vehicle on every section of the deduced path is calculated using the timings of the footprints. The vehicle's position on the road at the reading's moment is determined by introducing some additional assumptions, like minimal acceleration and minimal velocity. The size of the footprints of a specific source influences the resolution of the oriented road sections that can be valued. Actually, the method emphasizes the more congested roads, because they statistically offer more readings. Those are identified even if they are minor roads, but, with worse accuracy. However, there will always be smaller streets and roads that this system will fail to exactly identify. Those areas of smaller streets, confined and closed within higher level arteries of the road network are referred to as 'regions' in the road network. Method/system 10 identifies 'passage' of the mobile sensor in such a region, and determines the average NTT value in that region. Indetermination of specific streets within regions of the road network is insignificant for the purpose of implementing method/system 10, because they usually behave in a similar way, otherwise specific streets that are more congested would stand out in the first place.

NTT values on an individual oriented section are calculated using the results obtained from all mobile sensors that passed that oriented road section, hence resulting in statistically determined NTT values for each oriented road section. The unification of the individual NTT values into a determined value per oriented road section is done with consideration of the confidence factor of each of the individual data. This confidence factor is a function of the accuracy, the amount of footprints, the error rate, and so on.

In the transition process from individual to comprehensive NTT values, an additional filtering stage takes place. Irregularities of some sensors may again indicate irrelevancy (stationed or slow moving vehicle, stop-and-go vehicles like trash collectors, etc.) or error. Data from those mobile sensors are rejected and filtered out of the continuation in the processing of the data. The outcome of this step in method/system 10 is an NTT picture of the oriented road sections for a certain time stamp, as calculated and assessed out of the specific network of mobile sensors. Accordingly, there is forming a partial current vehicular traffic situation picture associated with each network source of mobile sensors.

As indicated in FIG. 1, prioritized, filtered, and controlled, vehicular traffic data and information associated with each source are transmitted from Sampler software module 1 to NTT calculator software module 2. NTT calculator software module 2 identifies the path taken by every vehicle from the consecutive footsteps of the mobile sensor associated with each vehicle. A small number of low-accuracy locations can fit several possible paths, but with each additional footstep of the vehicle, the number of path alternatives is reduced, and the path is determined by method/system 10 only when the set of footsteps points to one path in high probability. The probability influences the confidentiality of the path.

FIG. 3 is a pictorial diagram illustrating exemplary results obtained from the process of path identification using vehicular traffic data and information acquired from mobile sensors of a cellular phone mobile communication network, and, FIG. 4 is a pictorial diagram illustrating exemplary results obtained from the process of path identification using vehicular traffic data and information acquired from mobile sensors of an anti-theft mobile communication network. For purposes of clarity, background 70 in FIG. 3, and, background 80 in FIG. 4, each corresponds to a GIS type representation of road network 12 (FIG. 1).

Sectors, for example, sectors 72, 74, and, 76, in FIG. 3, and, squares, for example, squares 82, 84, and, 86, in FIG. 4, represent the footprints corresponding to the tracking data obtained from the two different types of mobile communication networks, that is, from a cellular phone mobile communication network, and, from an anti-theft mobile communication network, respectively. Location accuracy in FIGS. 3 and 4 is approximately 0.5-1.0 km. In FIGS. 3 and 4, the path identified by NTT calculator software module 2 of method/system 10 is indicated by the dark lined path, that is, dark lined path 90 in FIG. 3, and, dark lined path 100 in FIG. 4, which is exactly the one taken by the vehicle, as shown by highly accurate readings, indicated by the set of small solid diamonds 92 in FIG. 3, and, by the set of small solid circles 102 in FIG. 4, obtained from a GPS tracking system serving as control data.

Once a path is identified, the normalized travel times (NTTs) values between the footsteps are calculated, hence, NTT values of the plurality of oriented road sections for an individual vehicle are assessed. At this stage, the determined path of the mobile sensor may be identified as crossing a 'region' of streets having low vehicular traffic congestion. Ordinarily, footprint accuracy prevents identification of specific streets in such a region. NTT calculator software module 2 processes such regions as a special type of oriented road section and allocates the region with a calculated NTT value that is a good average indicating crossing time of the region, no matter which one of the inner roads is traveled along by the vehicle.

In the next part of Step (d) of method/system 10, individual NTT values calculated in a given processing cycle for every oriented road section are accumulated and statistically analyzed for providing a mean NTT value for each respective oriented road section. Eventually, more than one NTT (statistical 'peak') value is identified, thereby, suggesting the possibility of different lanes having different NTT values. Such a situation occurs, for example, when an oriented road section has several lanes, each with a different NTT value.

The overall data processing of Step (d) forms a current snapshot of NTT values on part of road network 12, and, thus, on part of oriented section network 14 (FIG. 1). The partiality of the vehicular traffic situation picture originates from the fact that only a portion of the roads in road network 12 are monitored in every calculation cycle. This partial picture is fused in the next step, Step (e), with similar partial current vehicular traffic situation pictures obtained from other sources, if any, according to a particular application of method/system 10, and, with specific reports received from traffic control authorities and others. FIG. 5 is a schematic diagram illustrating a partial current vehicular traffic situation picture, generally indicated as 110, featuring current NTT values, obtained from an exemplary network source 62 (FIG. 2) of mobile sensor vehicular traffic data and information, and indicated for each oriented road section of an exemplary part of an oriented road section network 14 (FIG. 1).

In Step (e), there is fusing the partial current traffic situation picture associated with each source, for generating a single complete current vehicular traffic situation picture associated with the entire oriented road section network.

The partial current traffic situation picture associated with each source, for the plurality of sources of vehicular traffic data and information, is fused by a Fusion and current Picture generator module 3, as indicated in FIG. 1, for generating a single complete current vehicular traffic situation picture associated with the entire oriented road section network. Due to the generic procedures of the data processing of method/system 10 (FIG. 1), representations of the partial current traffic situation pictures obtained from all mobile sources 62 are similar. Vehicular traffic data and information acquired from other types of sources, for example, acquired from sources 60 of fixed sensors, sources 64 of traffic reports by police or radio broadcasts of vehicular traffic data and information, and, sources 66, of other types of vehicular traffic data and information, are respectively processed. The acquiring of vehicular traffic data and information from the variety of sources, and integrating or fusing, by way of Fusion and current Picture generator software module 3, into one coherent or complete single current vehicular traffic situation picture is done in regular time intervals. For example, in a non-limiting way, the sequence of Steps (b)-(e) is performed at a pre-determined frequency in a range of from about once per every two minutes to about once per every ten minutes.

'Final' NTT values for each of the oriented road sections is obtained by integrating or fusing NTT values associated with all of the individual sources. NTT values associated with each source are weighed with a confidence factor appropriate for each respective source, where confidence factors are determined by source parameters, such as location accuracy, and, quality and quantity of sensors per source. This current vehicular traffic situation In the first procedure, gaps are filled in using NTT values that are predicted, for those missing oriented road sections, in previous cycles of the process, that is, in previous time intervals of performing Steps (b)-(e) of method/system 10. In the initial cycles of the process, some default values are determined by the analysis of historical vehicular traffic data and information, and road types. It is to be emphasized, that this stage of the overall process is continuously performed, and therefore, each single complete current vehicular traffic situation picture associated with the entire oriented road section network is based on the combination of predictions and new vehicular traffic data and information.

In the second procedure, gaps in the current partial vehicular traffic situation picture are filled in by using a set of vehicular traffic rules for describing the interdependence, interrelation, and mutual correlation of vehicular traffic parameters among the plurality of oriented road sections in a particular region. Some of the vehicular traffic rules supply default values of the vehicular traffic parameters. The vehicular traffic rules are derived by, and based on, analyzing historical vehicular traffic data and information.

In Step (f), there is predicting a future complete vehicular traffic situation picture associated with the entire oriented road section network.

Predicting a future complete vehicular traffic situation picture associated with the entire oriented road section network is performed by a Predictor software module 4, as indicated in FIG. 1. From the previous step, Step (e), the single complete current vehicular traffic situation picture associated with the entire oriented road section network, which is obtained by fusing the partial current traffic situation picture associated with each source, for the plurality of sources of vehicular traffic data and information, serves as a baseline or starting point for predicting future layers of vehicular traffic situation pictures. Step (f) is performed at a pre-determined frequency in a range of from about once per every two minutes to about once per every ten minutes. Typically, for implementation, in a non-limiting fashion, the frequency of performing this step is usually less than the frequency of performing Steps (b)-(e).

The concept of the model of the comprehensive oriented road section network 14 (FIG. 1), dictates the process and the set of prediction tools for implementing method/system 10. Forming current vehicular traffic situation pictures, and forecasting or predicting future vehicular traffic situation pictures, are determined with the aid of vehicular traffic behavior patterns and rules, which are generated by a Patterns and rules generator module 6, as indicated in FIG. 1.

Vehicular traffic behavior patterns feature behavior rules of individual oriented road sections and correlation rules among the plurality of different oriented road sections, of the entire oriented road section network 14. Accordingly, by using both types of rules, the step of predicting a future complete vehicular traffic situation picture associated with a particular oriented road section in a region within the entire oriented road section network, is influenced by both the current vehicular traffic situation picture associated with that particular oriented road section, and, by the plurality of current vehicular traffic situation pictures associated with other oriented road sections in the same region of the entire oriented road section network.

FIG. 6 is a graph, general indicated as graph 120, illustrating an example of vehicular traffic behavior associated with an exemplary oriented road section, in terms of different NTT values plotted as a function of time. Information featured in FIG. 6 demonstrates an example of an event identification and its influence on the prediction of a future vehicular traffic situation picture. The vehicular traffic behavior is associated with an exemplary oriented road section out of historical vehicular traffic data and information. When compared to calculated NTT values, indicated by hollow circles, determined from actual data, a significant discrepancy is observed. In this example, calculated NTT values are significantly higher than pattern NTT values, indicated by solid squares, determined from the vehicular traffic pattern based on historical vehicular traffic data and information. The resulting correction prediction NTT values, associated with the exemplary oriented road section, are indicated by solid triangles. The correction prediction NTT values are the NTT values that will be incorporated and fused into layers of future vehicular traffic situation pictures, associated with this particular oriented road section, for the 'prediction horizon' time period. These layers are permanently corrected with the formation of the current vehicular traffic situation pictures in following processing cycles.

The continuously updated comprehensive and complete current vehicular traffic situation picture serves as a baseline of a three-dimensional vehicular traffic forecast picture, where the horizontal plane represents the roadmap and the vertical axis represents progression of time. The three dimensional vehicular traffic situation picture is constructed from discreet layers of vehicular traffic situation pictures, in time-intervals of a given processing cycle. The lower layer vehicular traffic situation picture always corresponds to the current time, and higher layers of vehicular traffic situation pictures correspond to future predictions.

Future time layers are produced by operating prediction tools that are products of the analysis of historical vehicular traffic data and information. This analysis is an on-going processing of the incoming vehicular traffic data and information, and the main resulting tools are behavior patterns and correlation rules. A behavior pattern of a specific oriented road section describes the regular changing of the associated NTT values as a function of time, for example, during minute and hourly progression of a day. Every oriented road section has its own behavior pattern, and different behavior patterns describe the behavior in different circumstances, such as different days of the week, holidays, special events, weather conditions, and so on.

A correlation rule determines the correlation and interrelation of the vehicular traffic situation picture between different oriented road sections as a function of time. Correlation rules are mostly if-then rules. For example, they represent the fact that 'if' a road congestion is being observed on oriented road section A, 'then', a similar road congestion is expected to occur on oriented road section B after a certain period of time. These rules are the outcome of a data-mining operation, also known as an advanced database searching procedure, on the historical vehicular traffic data and information.

Oriented road sections tend to behave differently even without the attachment of a certain characteristic to each vehicular traffic behavior pattern. The observance of values of the current vehicular traffic situation picture in respect to optional vehicular traffic behavior patterns, and the operation of vehicular traffic pattern recognition methods determines the vehicular traffic pattern that describes the behavior of the oriented road section at an instant of time.

Furthermore, while regular situations are handled with these tools, unexpected vehicular traffic developments are identified from the current vehicular traffic situation pictures by comparing them to regular vehicular traffic behavior patterns. The set of several recently calculated NTT values on each oriented road section is compared to the pattern that describes the behavior of this oriented road section. Any significant discrepancy from the pattern activates a respective correction of the NTT values predicted for this section in the near future. The corrections are assuming continuous change rates and a 'back-to-normal' return after a prediction horizon period, as previously described above and graphically illustrated in FIG. 6. If the discrepancy identified is the result of a major event with prolonged influence, the acquired data in the subsequent processing cycles will prolong the correction period beyond the horizon period, until the gap between the regular pattern values and the acquired data is reduced.

Determination of the future behavior of individual oriented road sections from their respective traffic behavior patterns is integrated with the mutual horizontal influence of adjacent oriented road sections using the previously described correlation rules. These rules can predict, for example, the outcome of traffic events identified by the said discrepancies, and, predict their propagation in time along adjacent, and non-adjacent, oriented road sections.

In Step (g), there is using the current vehicular traffic situation picture and the future vehicular traffic situation picture for providing a variety of vehicular traffic related service applications to end users.

Method/system 10 (FIG. 1) of the present invention especially includes features for using the vehicular traffic data and information for comprehensively, yet, accurately and practicably, describing current and predicting future vehicular traffic situations and scenarios, from which the processed vehicular traffic data and information are used for providing the variety of vehicular traffic related service applications to the end users. Using the current vehicular traffic situation picture and the future vehicular traffic situation picture, obtained from the previous processing steps of method/system 10 (FIG. 1), for providing a variety of vehicular traffic related service applications to end users, is performed by a Service engine software module 5, as indicated in FIG. 1.

The unique structure of the three dimensional vehicular traffic situation picture leads to a corresponding method of analyzing it, in order to respond to traffic oriented queries associated with a variety of traffic related service applications. This analysis is performed by a designated software module, Service engine software module 5, for a variety of vehicular traffic related service applications 7, as indicated in FIG. 1. This software engine is capable of finding optimal routes between given points, estimating travel times and initiating alerts and route alterations when unexpected traffic events change the vehicular traffic situation picture. Any traffic related service application 7 featuring such queries can receive the necessary vehicular traffic data and information by simply connecting to Service engine software module 5 through the appropriate interface. FIG. 7 and FIG. 8 show two exemplary ways in which three-dimensional vehicular traffic situation pictures are used to enhance providing traffic related service applications 7 to end users.

FIG. 7 is a graphical diagram illustrating usage of a three-dimensional vehicular traffic situation picture for providing route recommendation types of traffic related service applications to end users. In FIG. 7, three-dimensional vehicular traffic situation picture, generally indicated as 130, has each time-layer marked with its time-stamp (t-axis). In a current time, represented by lowest layer 132, a query arrives from a service application 7 (FIG. 1), inquiring for the fastest route from A to B. A recommendation based on the current vehicular traffic situation picture alone is shown by the dotted line on right hand graph 134. With the three-dimensional prediction model, a parallel recommendation analyzes the alternatives in a way that every particular oriented road section is chosen in respect to the predicted vehicular traffic situation 'at the time of passage of that particular oriented road section'. The choice of the oriented road section is a function both of its predicted NTT value and the confidence factor of that prediction. This last factor is determined for oriented road sections according to the regularity, the stability, and, the fluctuation rate of the historical behavior of each evaluated oriented road section. Comparative results of using a static analysis and the predictive analysis can be quite different, as shown in graph 134.

FIG. 8 is a graphical diagram illustrating usage of a three-dimensional vehicular traffic situation picture for providing traffic alerts and alternative route recommendation types of traffic related service applications to end users. In FIG. 8, three-dimensional vehicular traffic situation picture, generally indicated as 140, has each time-layer marked with its time-stamp (t-axis). FIG. 8 shows the same model for initiation of alerts and recommendations of alternative routes. The 'unexpected' traffic event 142 that happens at the current, lower layer, time, is way off the recommended route. However, the correlation rules show that the influence of unexpected traffic event 142 will propagate in time, resulting in road congestion that will reach one of the oriented road sections of the recommended route 'at the time that the vehicle is supposed to pass unexpected traffic event 142. Therefore, an alert is sent to the driver with a recommendation of one or more known alternative routes.

Method/system 10 of the present invention provides vehicular traffic data and information, and, provides a variety of vehicular traffic related service applications to end users, on the basis of existing infrastructure of vehicular traffic data and information acquisition and collection, such as by using a cellular phone mobile communication network, and the construction of centralized dynamic vehicular traffic situation pictures, both current and future, for a geographical area within road network 12 (FIG. 1). The character of the vehicular traffic data and information and processing of it requires unique, elaborate, and comprehensive, handling during the entire sequence of processing steps, Steps (a) through (g), as is represented in the above description.

The present invention is implemented for acquiring, modeling, and processing vehicular traffic data and information, in order to be compatible with a wide variety of end user types of traffic related service applications. Therefore, it is a main aspect of the present invention that the 'data providing mobile sensors' are not limited to being those which are associated with the particular end users of such traffic related service applications. Hence, acquiring the vehicular traffic data and information from the data providing network does not depend at all on a specific group of mobile sensor device carrying end users.

The final result of method/system 10 (FIG. 1) is, therefore, a continuously on-going repetitive sequence of generating dynamic vehicular traffic situation pictures. The sequence is updated in predetermined time intervals, as previously described above, preferably, in a range of between about once per every two minutes to about once per every ten minutes. The described sequence of generating dynamic three-dimensional vehicular traffic situation pictures serves as a highly accurate and precise data base for vehicular traffic related service applications.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system configured to model and process vehicular traffic data, comprising:
   executable software configured to acquire vehicular traffic data associated with said road network from a sample of a plurality of mobile sensors in communication with a cellular wireless telecommunications network, the software stored in a computer readable medium and comprising instructions for selected said sample of said plurality of mobile sensors and for tracking locations of mobile sensors of said sample over the road network;
   wherein acquiring vehicular traffic data includes determining a normalized travel time (NTT) of the mobile sensors or a statistic indicating the travel speed, where the NTT refers to a travel time normalized with respect to a predetermined distance;
   the computer readable medium further comprising instructions for representing a road network associated with the vehicular traffic data and information, the road network comprising a plurality of road sections; and
   the computer readable medium further comprising instructions for protecting the privacy of individuals associated with said mobile sensors of said sample by automatically deleting identities of said mobile sensors of said sample in response to incorporation of their derived velocities into processing associated with the plurality of sections.

2. The system of claim 1, comprising an interface configured to receive location data and/or information provided by a server of a mobile wireless telecommunications network.

3. The system of claim 1, wherein said mobile sensors of said sample are selected from the group consisting of: computer devices; cellular phone devices; vehicle anti-theft devices; and combinations thereof.

4. The system of claim 1, wherein said software obtains locations of said mobile sensors of said sample from said wireless communications system in known time intervals.

5. The system of claim 1, wherein a path of a vehicle on the road network is determined in terms of a plurality of said road sections.

6. The system of claim 1, further comprising a mechanism configured to identify said mobile sensors of said sample having a relatively fast movement indicating vehicular movement.

7. The system of claim 1, wherein said mobile sensors of said sample include cellular mobile telephones and/or computers in communication with a wireless cellular telecommunications network, and wherein said software identifies said mobile cellular devices whose cell transition and/or handover rates indicate a relatively fast movement indicative of vehicular movement.

8. The system of claim 1, wherein said mobiles sensors of said sample include mobile vehicle anti-theft devices and wherein said software identifies said mobile vehicle anti-theft devices indicating ignition activation potentially indicating vehicular movement.

9. The system of claim 1, wherein said tracking is performed by polling said locations of said mobile sensors of said sample in known time intervals.

10. The system of claim 1, wherein said software is further configured to perform the step of filtering out said mobile sensors of said sample that are recognized as noise.

11. The system of claim 1, wherein said software is further configured to perform the step of preventing said tracking of said mobile sensors of said sample that stop moving for a predetermined time interval.

12. The system of claim 1, wherein said software is further configured to perform the step of preventing said tracking of said mobile sensors of said sample that have traveled beyond the bounds of a sensible route.

13. The system of claim 1, wherein said software is configured to maintain said tracking within locating capacity of said wireless telecommunications network.

14. The system of claim 1, wherein said software is configured to acquire the vehicular traffic data by a procedure selected from the group consisting of: a push procedure; a pull procedure; and, combinations thereof; said push procedure is a mode of said acquiring the vehicular traffic data and information initiated by said mobile sensors of said sample, and, said pull procedure is a mode of said acquiring the vehicular traffic data and information initiated by a software module sampling said mobile sensors of said sample.

15. The system of claim 1, wherein said tracking is controlled according to a predefined and updated policy selected from the group consisting of: not to track too many said vehicles in a same region of said road network; focus said tracking on a certain problematic region of said road network; stop said tracking said vehicles that stopped for a pre-determined time interval; collect the vehicular traffic data and information within a certain limited capacity of a said wireless telecommunications network; and, combinations thereof.

16. The system of claim 1, wherein said road network is represented as a geographical information system (GIS) road network.

17. The system of claim 1, wherein each said road section of said road network represents a road section having a single vehicular traffic continuation option located at a head end road junction, said road section represents a unit featuring a plurality of consecutive road segments of said road network, said consecutive road segments positioned head-to-tail relative to each other are located between two road junctions, a tail end road junction and a said head end road junction, within said road network, and are characterized by similar vehicular traffic data and information, and, said single vehicular traffic continuation option refers to one of various vehicular traffic flow options said each vehicle may take within said road network.

18. The system of claim 17, wherein said vehicular traffic continuation option is selected from the group consisting of continuing to travel straight, taking a right turn, and, taking a left turn, from a said road segment joined or linked to a said head end road junction.

19. The system of claim 17, wherein, when lanes in various said road segments within said road section network are assigned to turning traffic, respective said road sections may yield different vehicular traffic data and information.

20. The system of claim 1, wherein a particular traffic situation or scenario characterizing a particular road section is interdependent and interrelated with other particular said traffic situations or scenarios characterizing other particular said road sections of said road section network.

21. The system of claim 1, wherein vehicular traffic data and information is sourced from a variety of sources, and wherein the variety of sources of the vehicular traffic data and information is selected from the group consisting of: fixed sensors; of mobile sensors; traffic reports by police; radio broadcasts of the vehicular traffic data and information; historical and event related vehicular traffic data and information; other sources of the vehicular traffic data and information; and combinations thereof.

22. The system of claim 21, wherein each said source is characterized by a variable level of accuracy.

23. The system of claim 1, arranged to provide input to a variety of vehicular traffic related Service applications selected from the group consisting of: finding optimal routes between given points of said road network; finding alternative routes between given points of said road network; estimating travel times between given points of said road network; initiating alerts and route alterations when unexpected traffic events change said current vehicular traffic situation picture; and, combinations thereof.

24. The system of claim 1, wherein the derived velocities are characterized by NTT values.

25. A system configured to model and process vehicular traffic data, comprising:
  executable software configured to acquire vehicle traffic data associated with said road network from a sample of a plurality of mobile sensors in communication with a cellular wireless telecommunications network, the software stored in a computer readable medium and comprising instructions for selecting said sample of said plurality of mobile sensors and for tracking locations of mobile sensors of said sample over the road network;
  wherein acquiring vehicular traffic data includes determining a normalized travel time (NTT) of the mobile sensors or a statistic indicated the travel speed, where the NTT refers to a travel time normalized with respect to a predetermined distance;
  the computer readable medium further comprising instructions for representing a road network associated with the vehicular traffic data and information, the road network comprising a plurality of road sections; and
  the computer readable medium further comprising instructions for protecting the privacy of individuals associated with said mobile sensors of said sample by automatically deleting individual sensor tracks of said mobile sensors of said sample in response to incorporation of their derived velocities into processing associated with the plurality of sections.

* * * * *